(12) United States Patent
Serkh et al.

(10) Patent No.: US 8,403,800 B2
(45) Date of Patent: Mar. 26, 2013

(54) SHIFT MECHANISM FOR A PLANETARY GEAR TRANSMISSION

(75) Inventors: Alexander Serkh, Troy, MI (US); Dean Schneider, Washington, MI (US)

(73) Assignee: The Gates Corporation, Denver, CO (US)

( * ) Notice: Subject to any disclaimer, the term of this patent is extended or adjusted under 35 U.S.C. 154(b) by 363 days.

(21) Appl. No.: 12/804,720

(22) Filed: Jul. 28, 2010

(65) Prior Publication Data
US 2012/0028751 A1 Feb. 2, 2012

(51) Int. Cl.
*F16H 3/44* (2006.01)
*F16H 57/08* (2006.01)
(52) U.S. Cl. ......................... 475/269; 475/349
(58) Field of Classification Search .................. 475/269, 475/349
See application file for complete search history.

(56) References Cited

U.S. PATENT DOCUMENTS

| | | | | |
|---|---|---|---|---|
| 5,476,019 | A | 12/1995 | Cheever et al. | 74/506 |
| 5,823,058 | A | 10/1998 | Arbeiter | 74/489 |
| 5,921,139 | A | 7/1999 | Yamane | 74/473.13 |
| 6,276,227 | B1 | 8/2001 | Ose | 74/489 |
| 6,718,844 | B2 | 4/2004 | Hanatani | 74/502.2 |
| 6,877,393 | B2 | 4/2005 | Takachi | 74/502.2 |
| 7,150,205 | B2 | 12/2006 | Takachi | 74/502.2 |
| 2002/0137590 | A1* | 9/2002 | Shoge | 475/278 |
| 2003/0130079 | A1* | 7/2003 | Shoge | 475/276 |
| 2008/0300098 | A1* | 12/2008 | Serkh et al. | 475/347 |
| 2010/0069194 | A1 | 3/2010 | Cheng | |

FOREIGN PATENT DOCUMENTS

| | | |
|---|---|---|
| GB | 873987 A | 8/1961 |
| GB | 2355772 A | 5/2001 |

OTHER PUBLICATIONS

PCT/US2011/044938; Nov. 22, 2011; International Search Report and Written Opinion of the ISA.

* cited by examiner

*Primary Examiner* — Edwin A Young
(74) *Attorney, Agent, or Firm* — J. A. Thurnau, Esq.; P. N. Dunlap, Esq.

(57) ABSTRACT

A shift mechanism for a transmission comprising a planetary gear transmission, a shift cam engaged with a planetary gear assembly in the planetary gear transmission, the shift cam having a shift cam stop, a rotatable cable ring connected to a moveable cable, the cable ring comprising a ramped portion, a rotatable ramped ring, the ramped ring comprising a ramped portion cooperatively engaged with the cable ring ramped portion, and further the ramped ring having a stop cooperatively engagable with the shift cam stop, a rotation of the cable ring urges the ramped ring a predetermined distance in a direction normal to the plane of rotation of the cable ring, the shaft cam held against rotation by engagement with the ramped ring, and at which predetermined distance the ramped ring is allowed to rotate with the cable ring simultaneous with the axial movement of the ramped ring, and a spring connected between the cable ring and the shift cam, the shaft cam reacting to the spring force rotates upon rotation of the ramped ring by an amount of rotation that is limited by engagement of the shift cam stop with the ramped ring stop and during which rotation of the shift cam the transmission shifts gears.

3 Claims, 40 Drawing Sheets

| GEAR | 1 | 1.15 | 1 | 1.33 | 1.76 | 1 | 2.30 | i | GEAR | | Ctr | z6 | z5 | z1 | z2 | z3 | z4 | i |
|---|---|---|---|---|---|---|---|---|---|---|---|---|---|---|---|---|---|---|
| 1 | 1 | 1.15 | 1 | | | 1 | | 1 | 1 | | | | | | | | | |
| 2 | 1 | | 1 | | | 1 | | 1.1536 | 2 | 15.36% | 43 | 57 | 60 | 26 | 17 | 14 | 29 | 1.1536 |
| 3 | 1 | 1.15 | | 1.33 | | 1 | | 1.3285 | 3 | 15.16% | 46 | 59 | 66 | 26 | 20 | 13 | 33 | 2.3000 |
| 4 | 1 | | 1 | 1.33 | | 1 | | 1.5325 | 4 | 15.36% | 55 | | 72 | 38 | 17 | | | 1.5278 |
| 5 | 1 | 1.15 | | | 1.76 | 1 | | 1.7628 | 5 | 15.03% | 55 | 68 | | 38 | 17 | 13 | 42 | 1.7628 |
| 6 | 1 | | 1 | | 1.76 | 1 | | 2.0335 | 6 | 15.36% | 55 | 78 | | | 17 | 23 | 32 | 1.3285 |
| 7 | 1 | 1.15 | 1 | | | | 2.30 | 2.3000 | 7 | 13.10% | | | | | | | | |
| 8 | 1 | | 1 | 1.33 | | | 2.30 | 2.6532 | 8 | 15.36% | | | | | | | | |
| 9 | 1 | 1.15 | | 1.33 | | | 2.30 | 3.0556 | 9 | 15.16% | | | | | | | | |
| 10 | 1 | | | 1.33 | 1.76 | | 2.30 | 3.5248 | 10 | 15.36% | | | | | | | | |
| 11 | 1 | 1.15 | | | 1.76 | | 2.30 | 4.0545 | 11 | 15.03% | | | | | | | | |
| 12 | 1 | | | | 1.76 | | 2.30 | 4.6771 | 12 | 15.36% | | | | | | | | |

FIG.2

|    | BRAKE 1 | BRAKE 4 | BRAKE 2 | BRAKE 3 | CL1 | CL2 | CL3 |
|----|---------|---------|---------|---------|-----|-----|-----|
| 1  | --      | --      | --      | --      | X   | X   | X   |
| 2  | --      | --      | X       | --      | X   | --  | X   |
| 3  | X       | --      | --      | --      | --  | X   | X   |
| 4  | X       | --      | X       | --      | --  | --  | X   |
| 5  | --      | X       | --      | --      | --  | X   | X   |
| 6  | --      | X       | X       | --      | --  | --  | X   |
| 7  | --      | --      | --      | X       | X   | X   | --  |
| 8  | --      | --      | X       | X       | X   | --  | --  |
| 9  | X       | --      | --      | X       | --  | X   | --  |
| 10 | X       | --      | X       | X       | --  | --  | --  |
| 11 | --      | X       |         | X       | --  | X   | --  |
| 12 | --      | X       | X       | X       | --  | --  | --  |

-- UNLOCKED
X  LOCKED

FIG.3

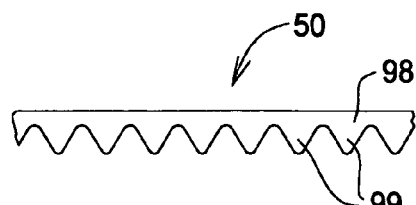
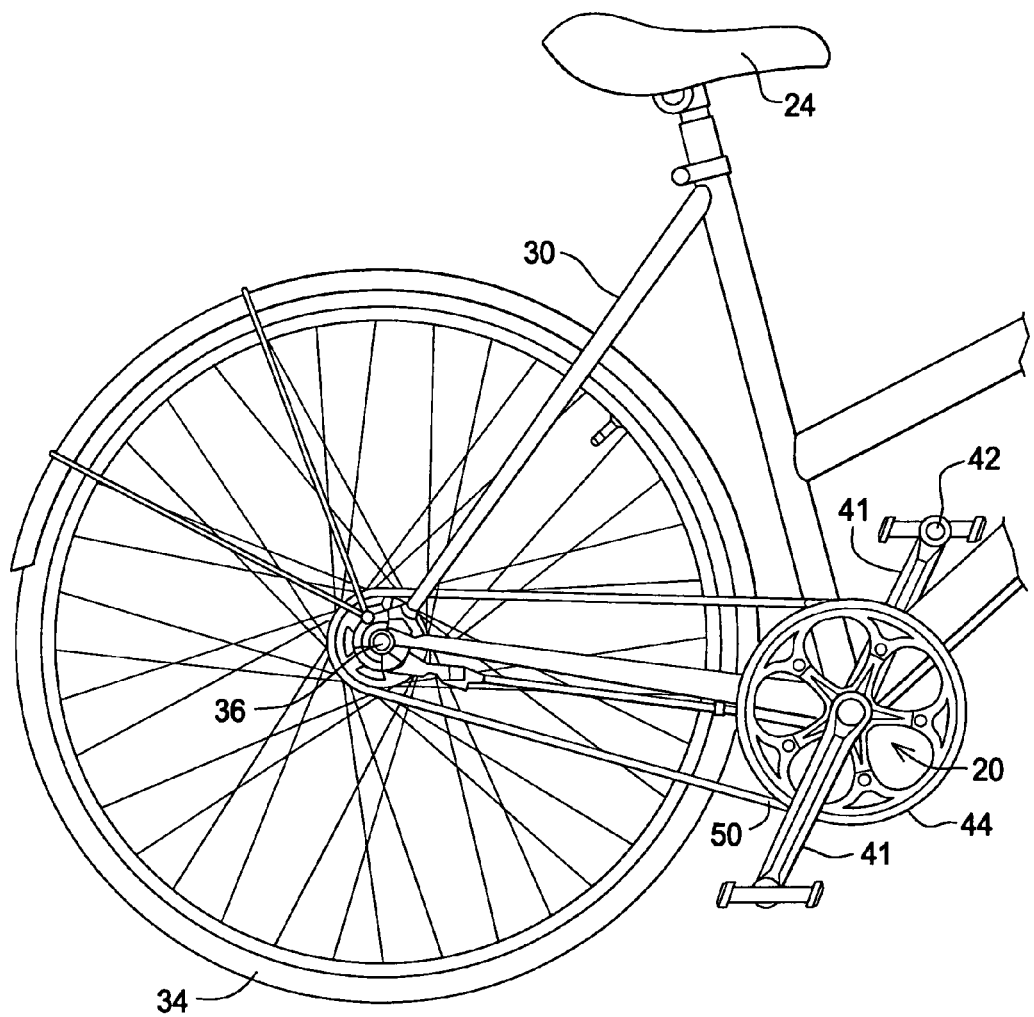

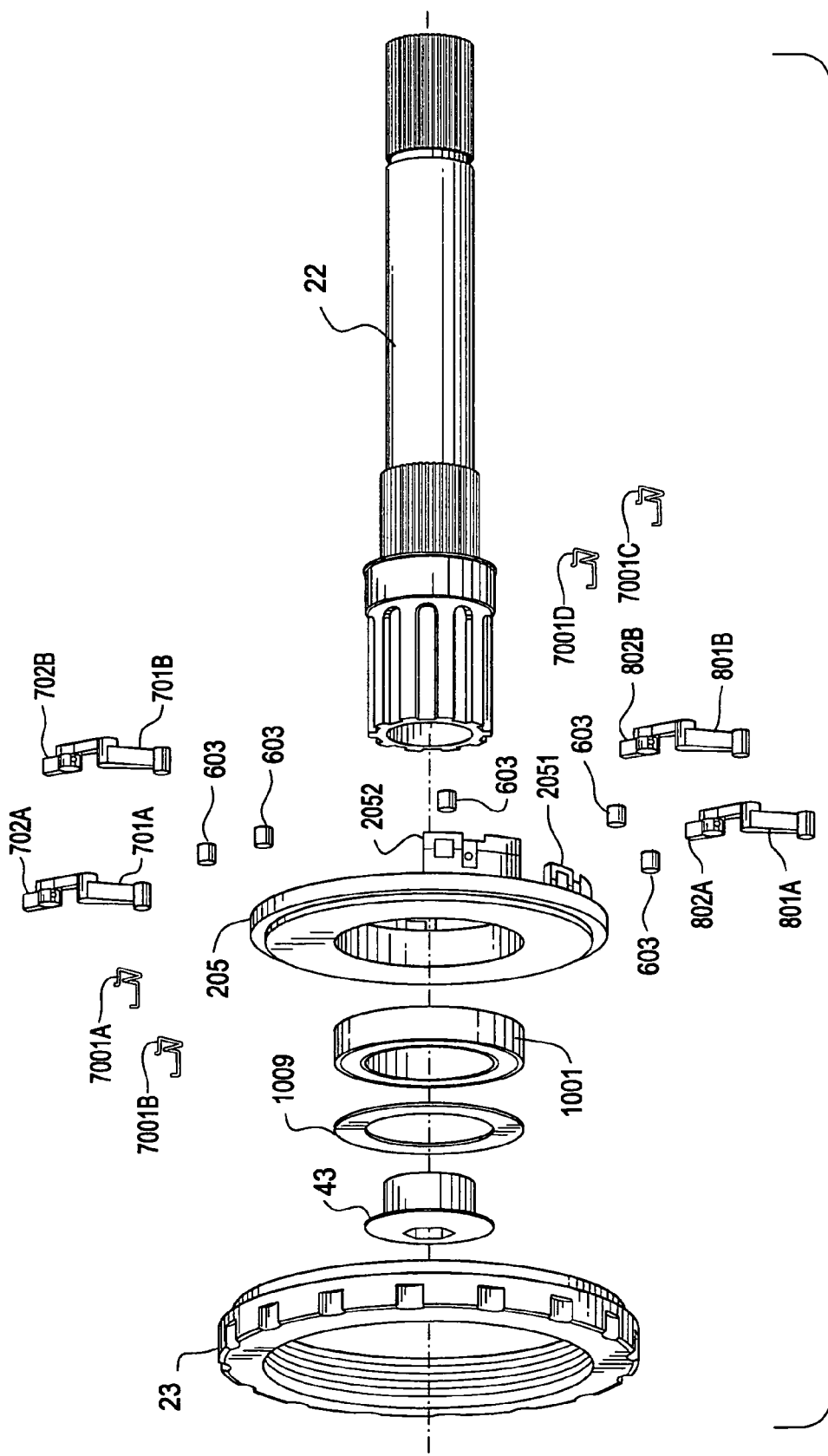

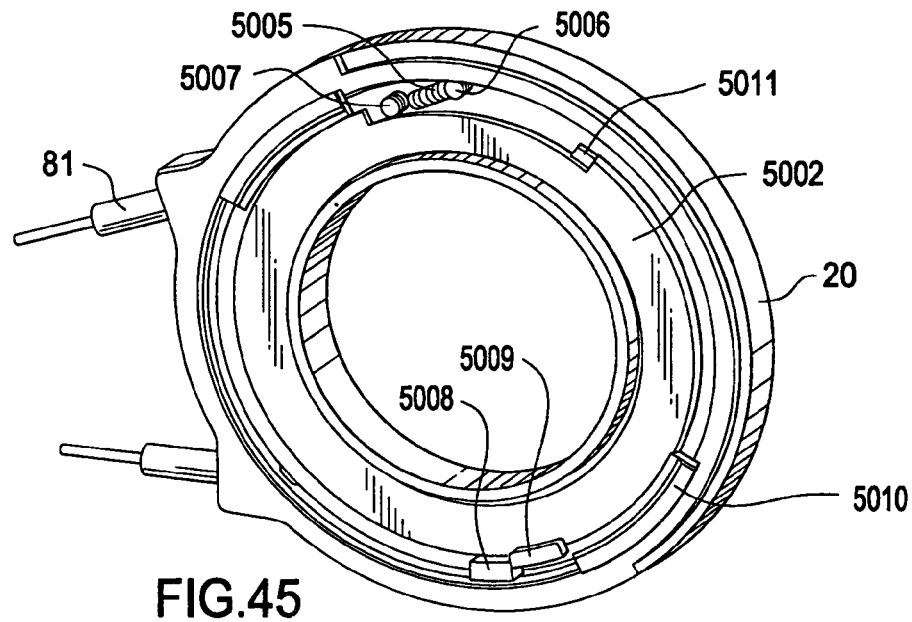
FIG. 45
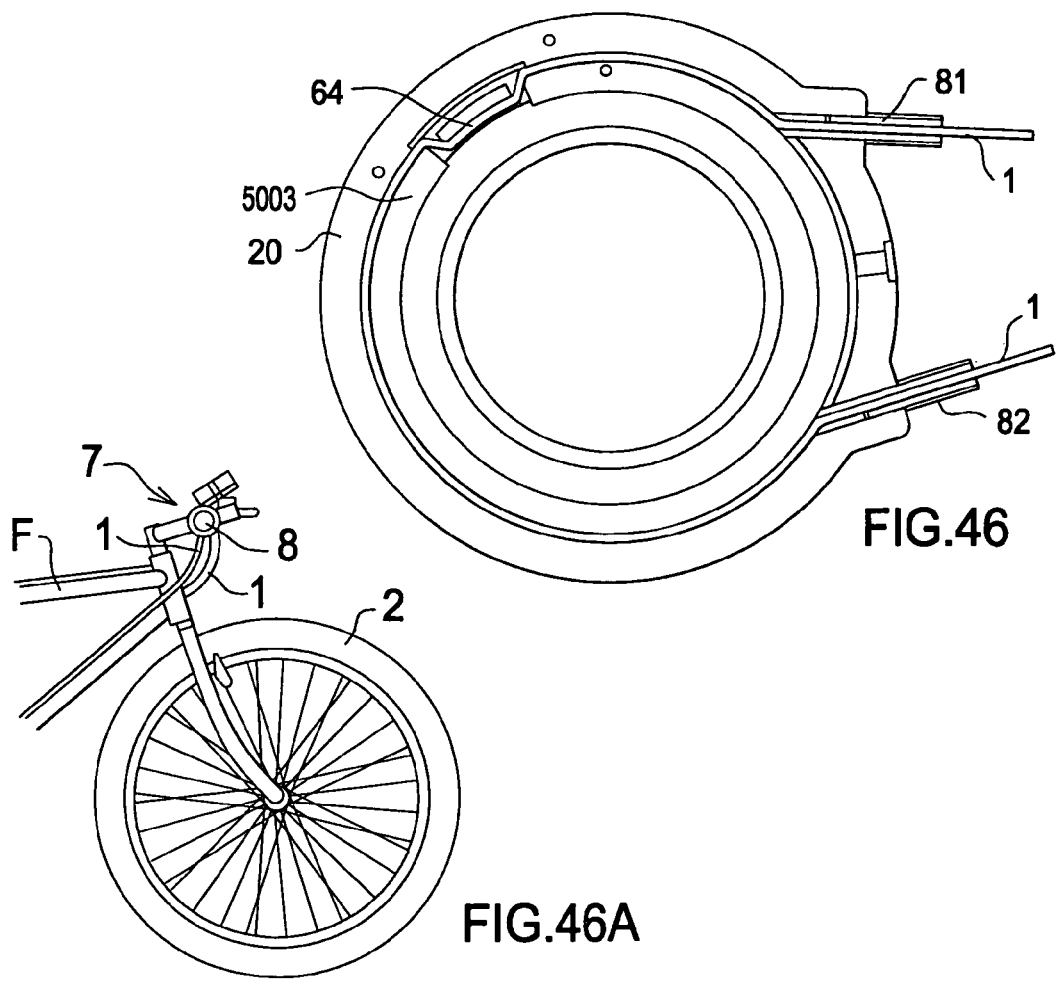
FIG. 46
FIG. 46A

SHIFT MECHANISM FOR A PLANETARY GEAR TRANSMISSION

FIELD OF THE INVENTION

The invention relates to a shift mechanism for a planetary gear transmission, and more particularly, to a shift mechanism for a planetary gear transmission having a lost motion gear selector.

BACKGROUND OF THE INVENTION

It is known that bicycle transmissions can be operated by shifting mechanisms. Shifting mechanisms are typically designed to pull a cable which actuates transmission shifting element(s). There are different types of bicycle transmissions that can be operated by cable. These transmissions include traditional chain driven transmissions with rear and/or front derailleur's, internal geared hub transmissions, continuously variable transmissions (CVT's) and others.

Representative of the art is U.S. Pat. No. 6,718,844 (2004) to Hanatani which discloses a bicycle shift control device comprises a base member for attachment to the bicycle, a operating member rotatably supported relative to the base member for rotating in first and second directions, a transmission control member rotatably mounted relative to the base member for controlling the pulling and releasing of a transmission control element, a bracket for supporting a transmission control element diverting surface, and an intermediate member coupled for rotation with the transmission control member. The intermediate member rotates around a first axis, and the intermediate member can move in the direction of the first axis between an engagement position, in which the intermediate member engages the bracket, and a disengagement position, in which the intermediate member is disengaged from the bracket. The intermediate member includes a first cam surface for causing movement of the intermediate member in the direction of the first axis toward the disengagement position during rotation of the intermediate member, and the intermediate member includes a positioning surface for preventing the intermediate member from rotating around the first axis when the intermediate member is in the engagement position.

Reference is also made to copending U.S. non-provisional patent application Ser. No. 12/657,461 filed Jan. 20, 2010.

What is needed is a shift mechanism for a planetary gear transmission having a lost motion gear selector. The present invention meets this need.

SUMMARY OF THE INVENTION

The primary aspect of the invention is to provide a shift mechanism for a planetary gear transmission having a lost motion gear selector.

Other aspects of the invention will be pointed out or made obvious by the following description of the invention and the accompanying drawings.

The invention comprises a shift mechanism for a transmission comprising a planetary gear transmission, a shift cam engaged with a planetary gear assembly in the planetary gear transmission, the shift cam having a shift cam stop, a rotatable cable ring connected to a moveable cable, the cable ring comprising a ramped portion, a rotatable ramped ring, the ramped ring comprising a ramped portion cooperatively engaged with the cable ring ramped portion, and further the ramped ring having a stop cooperatively engagable with the shift cam stop, a rotation of the cable ring urges the ramped ring a predetermined distance in a direction normal to the plane of rotation of the cable ring, the shaft cam held against rotation by engagement with the ramped ring, and at which predetermined distance the ramped ring is allowed to rotate with the cable ring simultaneous with the axial movement of the ramped ring, and a spring connected between the cable ring and the shift cam, the shaft cam reacting to the spring force rotates upon rotation of the ramped ring by an amount of rotation that is limited by engagement of the shift cam stop with the ramped ring stop and during which rotation of the shift cam the transmission shifts gears.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 2 is a table of gear ratios.
FIG. 3 is a table of brake and clutch positions for each gear.
FIG. 4 is a partial side view of a bicycle.
FIG. 4A is a side view of a belt.
FIG. 20 is a detail of FIG. 14.
FIG. 45 is a side view of the shift mechanism inside the transmission housing.

FIG. 46 is a side view of the shift mechanism.
FIG. 46A is a detail of a handlebar shifter.

DETAILED DESCRIPTION OF THE PREFERRED EMBODIMENT

Figure 1:
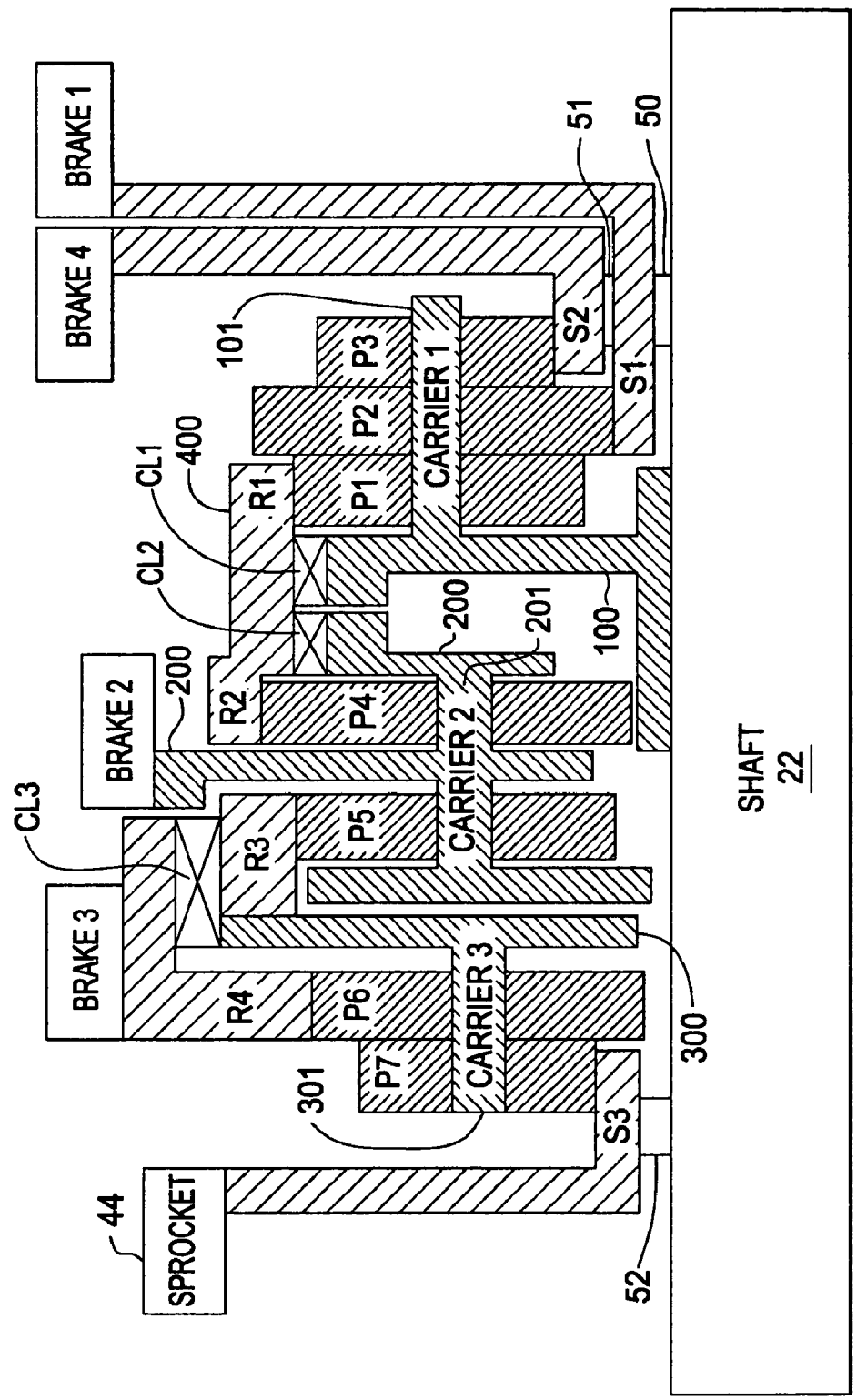
FIG. 1 is a cross-sectional schematic view of the transmission.

FIG. 1 is a cross-sectional schematic view of the transmission. The invention generally comprises a planetary gear mechanism having an input member connected to a first planetary mechanism, the first planetary mechanism connected coaxially in series to a second planetary mechanism, which second planetary mechanism is connected coaxially in series to a third planetary mechanism, the second planetary mechanism output is a step up in speed from the first planetary mechanism output, the third planetary mechanism output is a step up in speed from the second planetary mechanism output, and the third planetary mechanism connected to an output member.

The proposed transmission is preferably located in a bicycle bottom bracket, see FIG. 4. Crank arms (see FIG. 4) are attached to each end of the input member 22. Carrier 100 is rigidly connected to the member 22, and thereby rotates with member 22. Carrier 100 further comprises a carrier pin or shaft 101.

Three planet pinion gears are journalled to pin 101, namely, P1, P2, P3. Each pinion gear P1, P2, P3 rotates together at the same speed about pin 101. Pinions P1, P2, P3 preferably comprise a single gear component having three different diameters, thereby describing gears P1, P2, P3.

Ring gear member 400 comprises a first ring gear R1 and a second ring gear R2. R1 is in meshing connection with pinion P1. Sun gears S1 and S2 are in meshing engagement with pinion gears P2 and P3 respectively. Sun gears S1 and S2 are reaction gears with brake 1 and brake 4. Brake 1 and brake 4 are connected to a bicycle frame (see FIG. 4). The rotational speed of pinion P1 is a function of whether brake 1 or brake 4 is engaged or disengaged, see FIG. 3.

Second planetary mechanism has two pinion gears P4 and P5 fixedly connected to a carrier shaft 201, and therefore gears P4 and P5 rotate together with shaft 201. Ring gear R2 is in meshing engagement with pinion gear P4. Carrier shaft 201 is journalled to carrier 200. Carrier 200 is a reaction member with and is engaged with brake 2.

A third ring gear R3 is fixedly attached to the input member of the third planetary mechanism which is carrier 300. The third planetary mechanism pinion gear P6 is in meshing engagement with fourth ring gear R4. Ring gear R4 is engaged with brake 3 and one-way clutch CL3. One-way clutch CL3 is engaged with carrier 300 and ring gear R3.

Pinion gear P6 and P7 are each journalled to carrier pin 301, and therefore rotate together. Pinion gears P6 and P7 preferably comprise a single gear component having two different diameters and hence define gears P6 and P7. Pinion gear P7 is in meshing engagement with output sun gear S3. Output sun gear S3 is fixedly attached to output sprocket 44.

All planetary carrier mechanisms are numbered as a function of increasing speed of their respective output members, that is, the third planetary mechanism causes rotation of sprocket 44, which in turn rotates faster than the relative rotation of the second planetary mechanism, which in turn rotates faster than the relative rotation of the first planetary mechanism when each planetary mechanism is operating with all one-way clutches dis-engaged, see FIG. 3 gear 12. Further, each planetary carrier mechanism is coaxial with the others and each of the planetary carrier mechanisms are connected in series.

Each planetary mechanism further comprises a one-way clutch, namely, CL1, CL2, CL3. When engaged each one-way clutch locks each respective planetary carrier mechanism with a gear ratio of 1:1.

A low-friction bushing 50 is disposed between input member 22 and sun gear S1. A low-friction bushing 51 is disposed between sun gear S1 and sun gear S2. A low-friction bushing 52 is disposed between sun gear S3 and input member 22.

For ease of reference, the following assemblies may also be generally referred to as the first planetary mechanism, second planetary mechanism and third planetary mechanism.

First planetary mechanism: carrier 100; pinion gears P1, P2, P3; shaft 101; one-way clutch CL1; ring gear R1

Second planetary mechanism: carrier 200; pinion gears P4, P5; shaft 201; one-way clutch CL2; ring gear R2; ring gear R3

Third planetary mechanism: carrier 300; pinion gears P6, P7; shaft 301; one-way clutch CL3; ring gear R4

FIG. 2 is a table of gear ratios. Planetary mechanism (carrier) 100 has gear ratios 1, 1.33, and 1.76. Planetary mechanism 200 has gear ratios 1 and 1.15. Planetary mechanism 300 has gear ratios 1 and 2.30. The combined overall gear ratio is noted in column i.

The inventive transmission results in very linear steps between each gear ratio averaging approximately 15%. This allows predictable power requirements for each shift as a rider shifts up and down through the gears.

Since the inventive transmission increases the speed of the output member front sprocket 44 compared to the speed of input member 22, the ratio between the front sprocket 44 and a rear sprocket 36 installed on the rear wheel 34 is adjusted accordingly. Hence, for example, front sprocket 44 has 32 teeth and the rear sprocket has 42 teeth. The number of teeth on the front sprocket and rear sprocket may be adjusted as may be required by a user.

FIG. 3 is a table of brake and clutch positions for each gear. For example, first gear, the slowest gear, has all planetary mechanisms 100, 200, 300 at gear ratio 1:1 and all clutches CL1, CL2, CL3, are locked. In first gear all brakes 1, 2, 3, 4 are disengaged.

The inventive transmission is about 20%-30% lighter than prior art transmissions. Another advantage of the transmission is better clearance in a bicycle frame since front sprocket is much smaller.

The following is provided as an example and is not intended to limit the design parameters which may be used for each component. The diameters are in mm.

| Pinion Gear | Ring Gear | Diameter | No. of Teeth |
|---|---|---|---|
| P1 | NA | 13.6 | 17 |
| P2 | NA | 18.4 | 23 |
| P3 | NA | 10.4 | 13 |
| P4 | NA | 11.2 | 14 |

-continued

| Pinion Gear | Ring Gear | Diameter | No. of Teeth |
|---|---|---|---|
| P5 | NA | 13.6 | 17 |
| P6 | NA | 16 | 20 |
| P7 | NA | 10.4 | 13 |
| NA | R1 | 57.6 | 72 |
| NA | R2 | 45.6 | 57 |
| NA | R3 | 48 | 60 |
| NA | R4 | 52.8 | 66 |

FIG. 4 is a partial side view of a bicycle. The inventive transmission will be preferably installed in bottom bracket 20. Crank arms 41 are connected to input member 22. A rider's feet engage pedals 42. A flexible drive member 50 is engaged between sprocket 44 and rear sprocket 36. Rear sprocket 36 is connected to wheel 34. A rider (not shown) sits on seat 24. Wheel 34, crank arms 41, bottom bracket 20, seat 24 are connected to bicycle frame 30, known in the art. Flexible drive member 50 may comprise a belt or chain.

FIG. 4A is a side view of a belt. Belt 50 comprises a body 98. Teeth 99 extend from belt body 98. Teeth 99 extend across the width of the belt and normal to a longitudinal or endless direction. This style of belt is also referred to as a toothed, cogged or synchronous belt as is known in the automotive arts.

Figure 5:
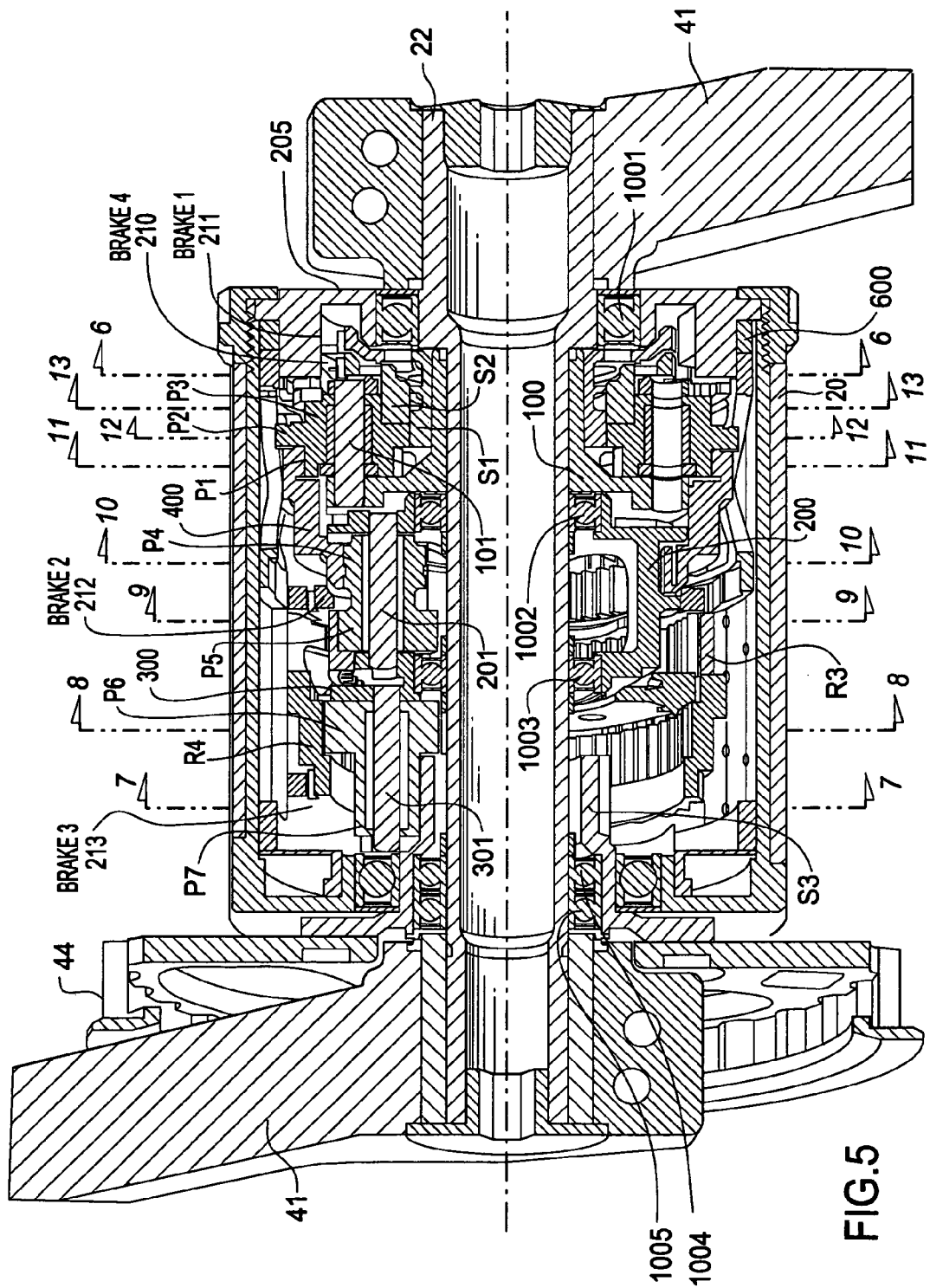
FIG. 5 is a cross-sectional view of the transmission.

FIG. 5 is a cross-sectional view of the transmission. Planetary carrier mechanisms 100, 200, 300 are shown connected in series within bottom bracket or a transmission housing 20. Carrier 100 is fixedly connected to input member 22. Carrier 200 is rotatable about member 22 on bearings 1002, 1003. Carrier 300 is rotatable about member 22 on bearings 1003, 1004, 1005. Member 22 rotates within bottom bracket 22 on bearing 1001. Member 22 may be hollow to reduce weight of the transmission.

Figure 6:
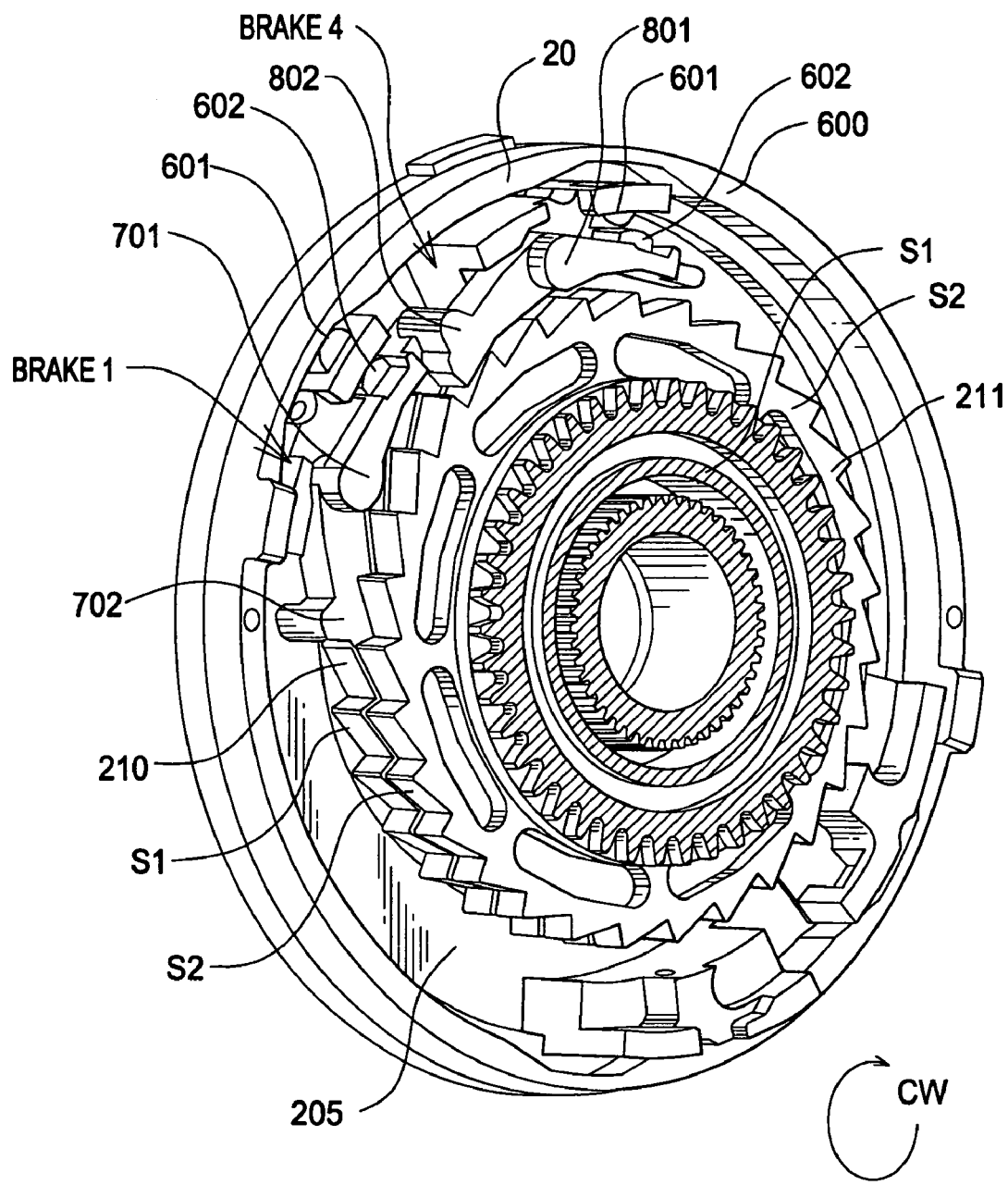
FIG. 6 is a perspective view of a brake.

FIG. 6 is a perspective view of a brake. The figure shows sun gears S1 and S2. Brake 1 engages sun gear S1. Brake 4 engages sun gear S2. The brake mechanisms for shifting the planetary transmission ensures that a compound planetary set cannot engage two gear sets at once and thus become locked. The proposed mechanism is located in the proximity of the sun gears of a compound planetary gear set but could easily be applied to breaking or shifting of a compound planetary gear set with multiple ring gears.

The mechanism comprises two levers (701,702) (801,802) configured in a manner such that one physically interferes or prohibits the other lever from engaging its sun gear while the other is engaged with its respective sun gear. When one sun gear is stopped by a brake, the other sun gear will be forced to rotate relative to the stopped sun gear. In the case of a compound set with more than two sun gears, each sun gear will rotate at a different speed than the others. However, if each brake is applied to each sun at the same time the transmission would lock and not rotate. Each lever limits the rotation or brakes their respective sun gear by engaging with a stepped area of the sun gear such that the lever engages the face of a step and limits the rotation of the sun in one direction. The mechanism could engage the sun gears from radially outside or radially inside depending on the configuration required.

The shift levers are actuated by a roller 601 that engages a profiled surface 601B. As the profile changes, the levers are moved to either engage as a brake or open and allow free movement of the respective sun gear.

Each brake 1 and brake 4 comprises a shift member 701 and 801 respectively. Shift cam 600 engages shift rollers 601. Each shift roller 601 engages a compliant pad or member 602. Each shift member 701 and 801 are pivotally mounted to end cap 205. Each end 702, 802 of each shift member 701, 801 engages sun gear teeth 210, 211 respectively.

In operation, shift cam 600 rotates enabling each shift roller 601 to move radially outward, thereby releasing each complaint pad 602. Releasing each complaint pad 602 enables each shift member 701, 801 to pivot due to the biasing caused by springs 7001 thereby causing shift members 701, 801 to engage sun gear teeth 210, 211 respectively. Engagement of each shift member 701, 801 with the respective sun gear teeth stops rotation of the respective sun gear in a clockwise direction CW.

The reaction force caused by engagement of the shift members 701, 801 with teeth 210, 211 is transmitted through each shift member 701, 801 to the end cap 205 and thereby to the bicycle frame.

Brake 2 and brake 3 are identical in description and operation to brake 1 and brake 4.

Figure 7:
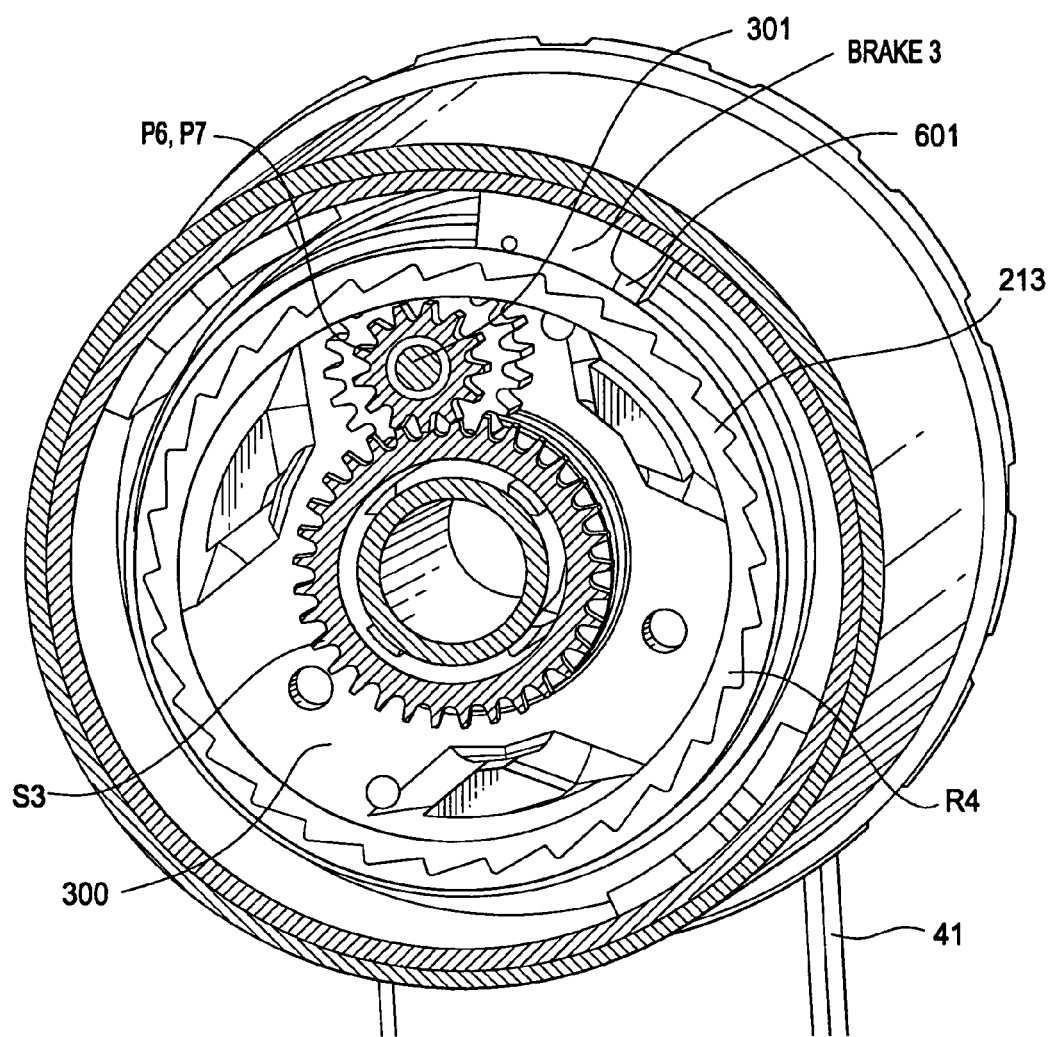
FIG. 7 is a cross-section at 7-7 in FIG. 5.

FIG. 7 is a cross-section at 7-7 in FIG. 5. Pinion gear P7 has a meshing engagement with sun gear S3. Brake 3 shift member 601 engages teeth 213. Teeth 213 are disposed on an outer perimeter of ring gear R4. In the instant embodiment there are three sets of pinion gears P6, P7.

Figure 8:
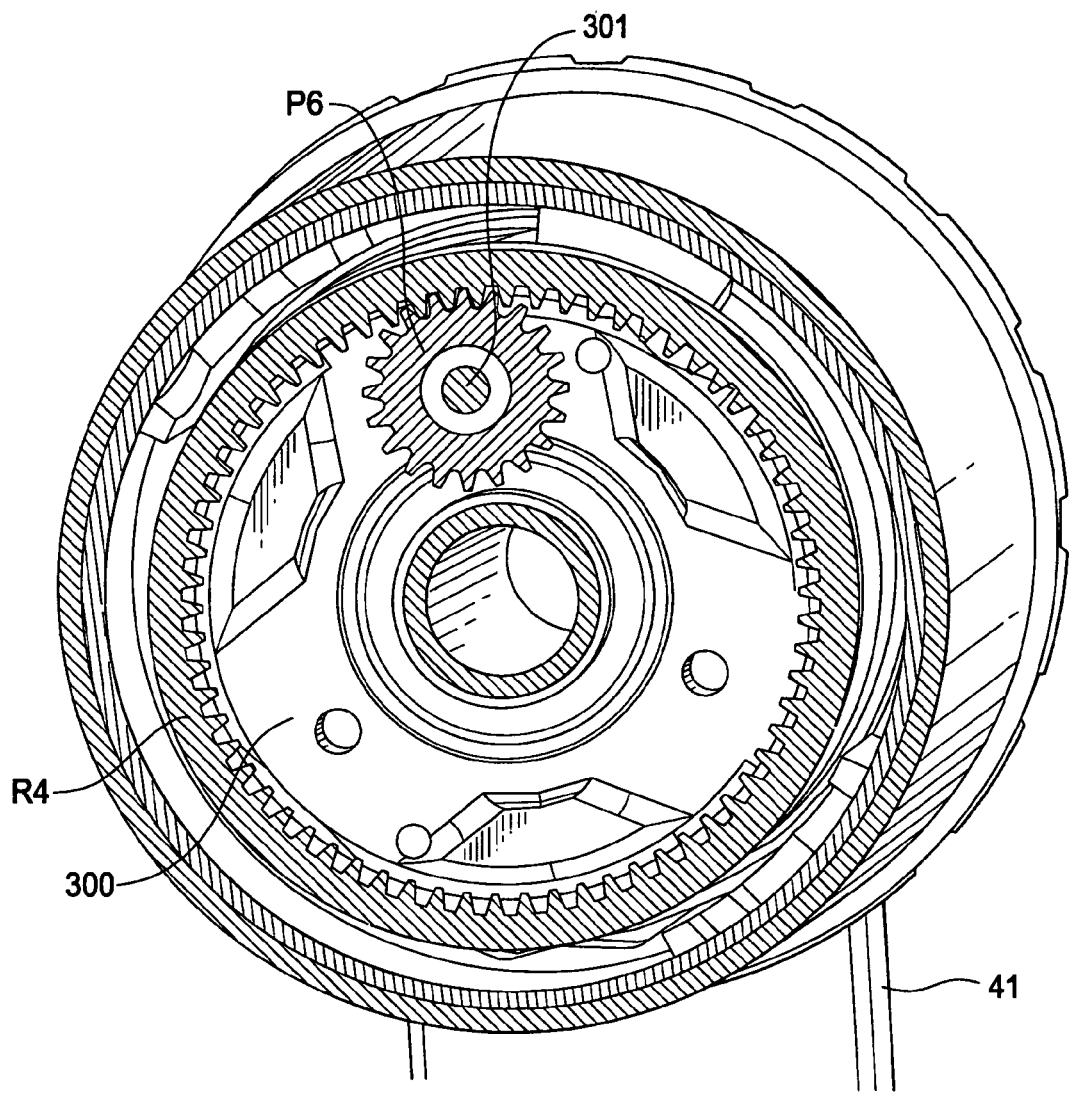
FIG. 8 is a cross-section at 8-8 in FIG. 5.

FIG. 8 is a cross-section at 8-8 in FIG. 5. Pinion gear P6 is journalled to pin 301.

Figure 9:
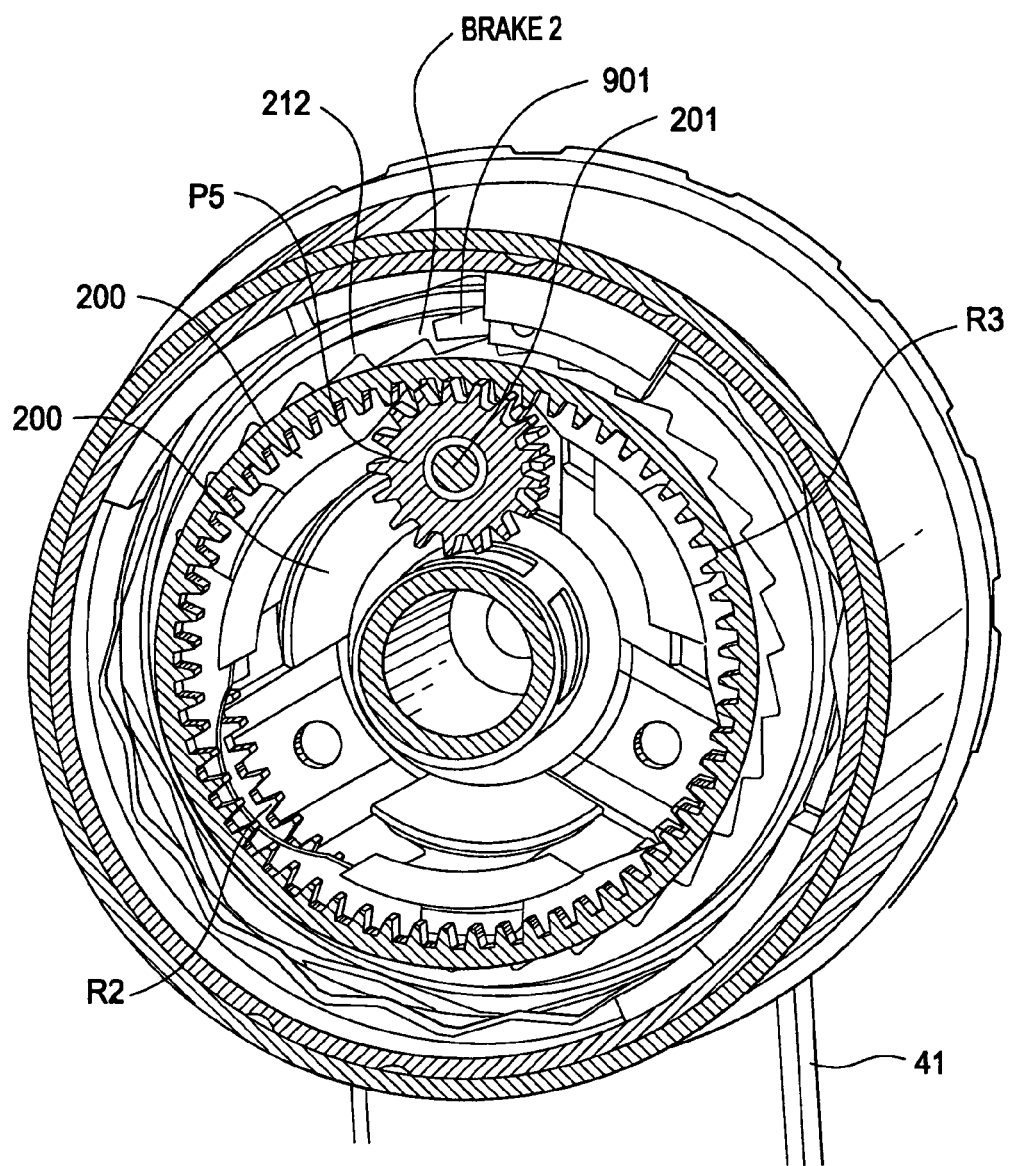
FIG. 9 is a cross-section at 9-9 in FIG. 5.

FIG. 9 is a cross-section at 9-9 in FIG. 5. Pinion gear P5 is journalled to pin 201. Pinion gear P5 has a meshing engagement with ring gear R3. Brake 2 comprises shift member 901 which engages teeth 212. Teeth 212 are disposed on an outer perimeter of carrier 200. In the instant embodiment there are three sets of pinion gears P4, P5.

Figure 10:
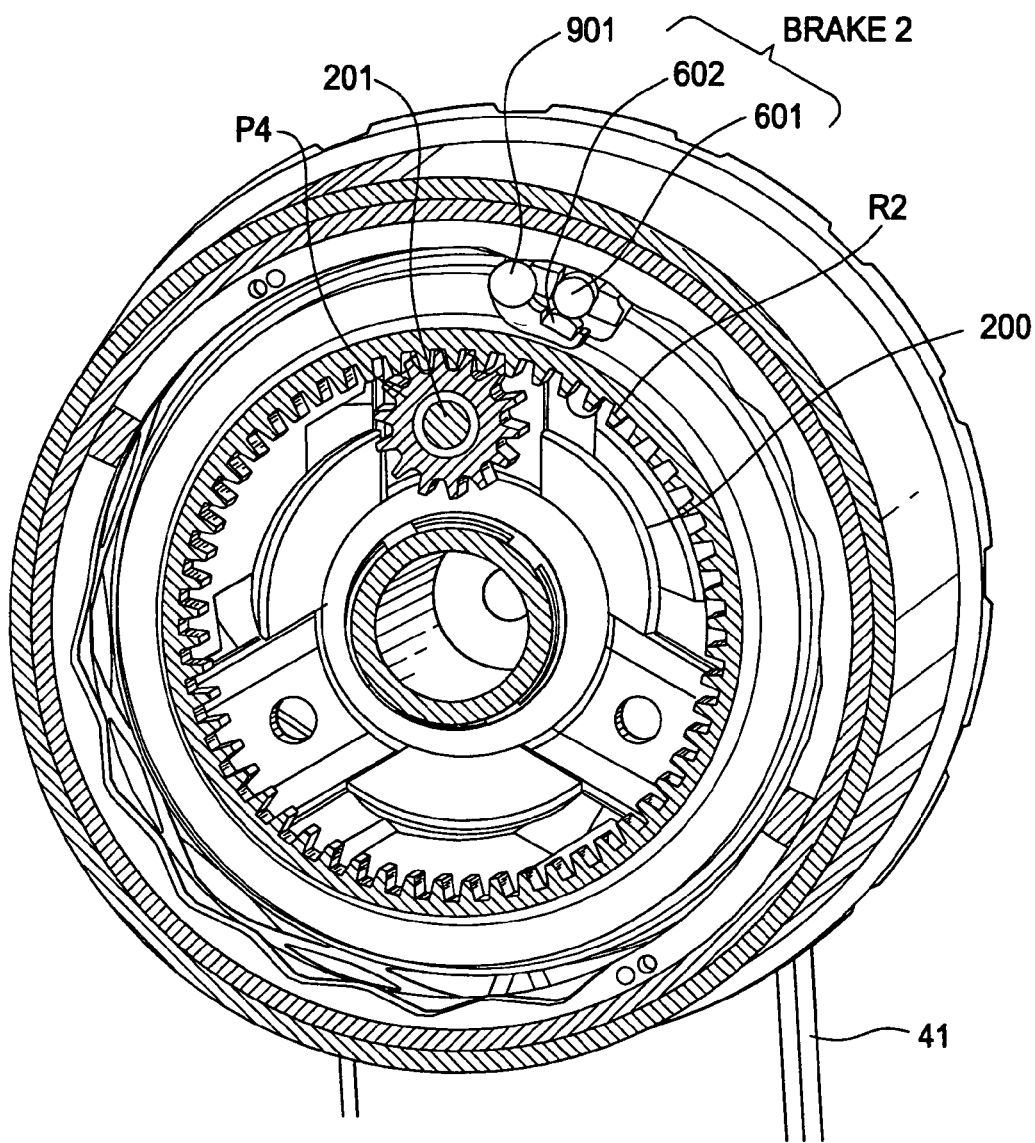
FIG. 10 is a cross-section at 10-10 in FIG. 5.

FIG. 10 is a cross-section at 10-10 in FIG. 5. Pinion gear P4 has a meshing engagement with ring gear R2.

Figure 11:
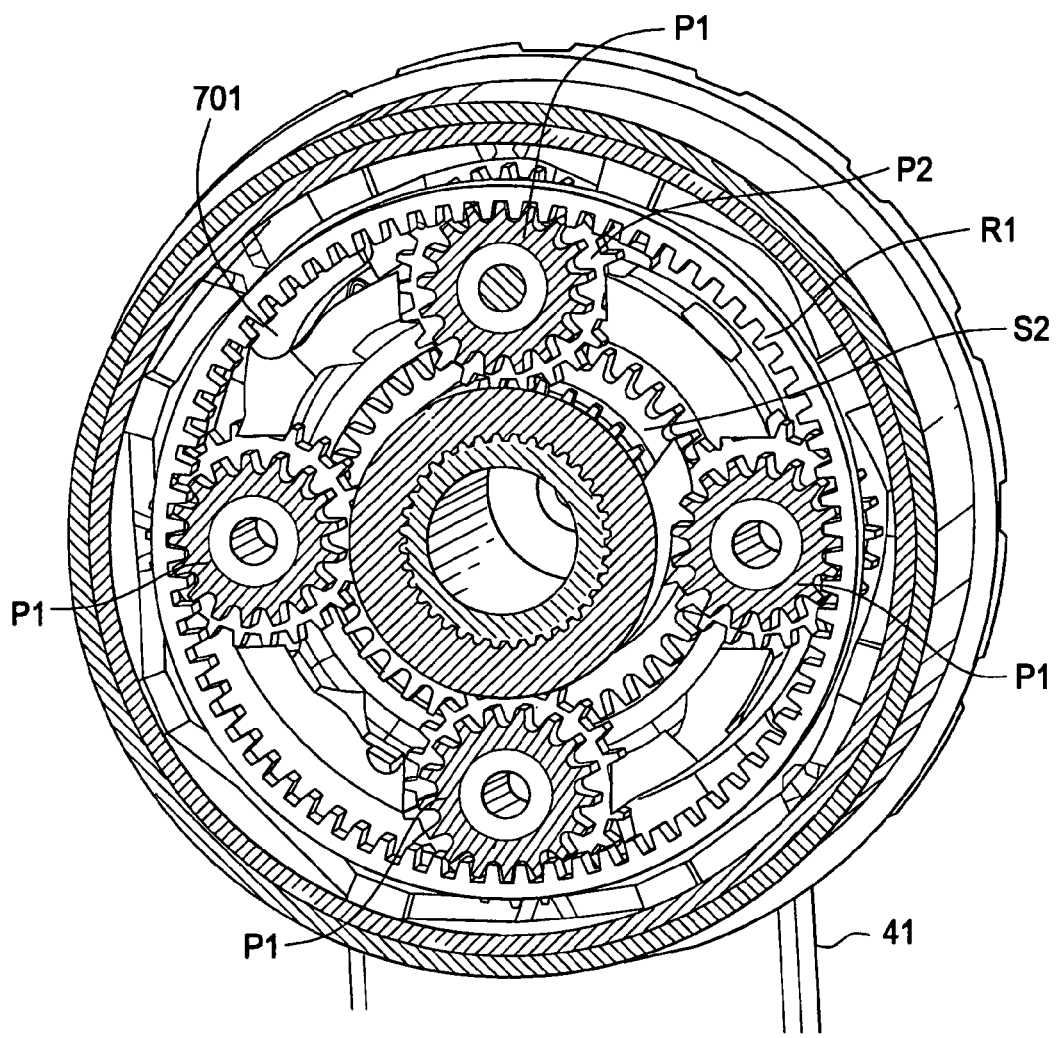
FIG. 11 is a cross-section at 11-11 in FIG. 5.

FIG. 11 is a cross-section at 11-11 in FIG. 5. Pinion gear 1 and P2 are journalled to pin 101. Pinion gear P1 has a meshing engagement with ring gear R1. In the instant embodiment there are four sets of pinion gears P1, P2, P3, each journalled to a pin 101.

Figure 12:
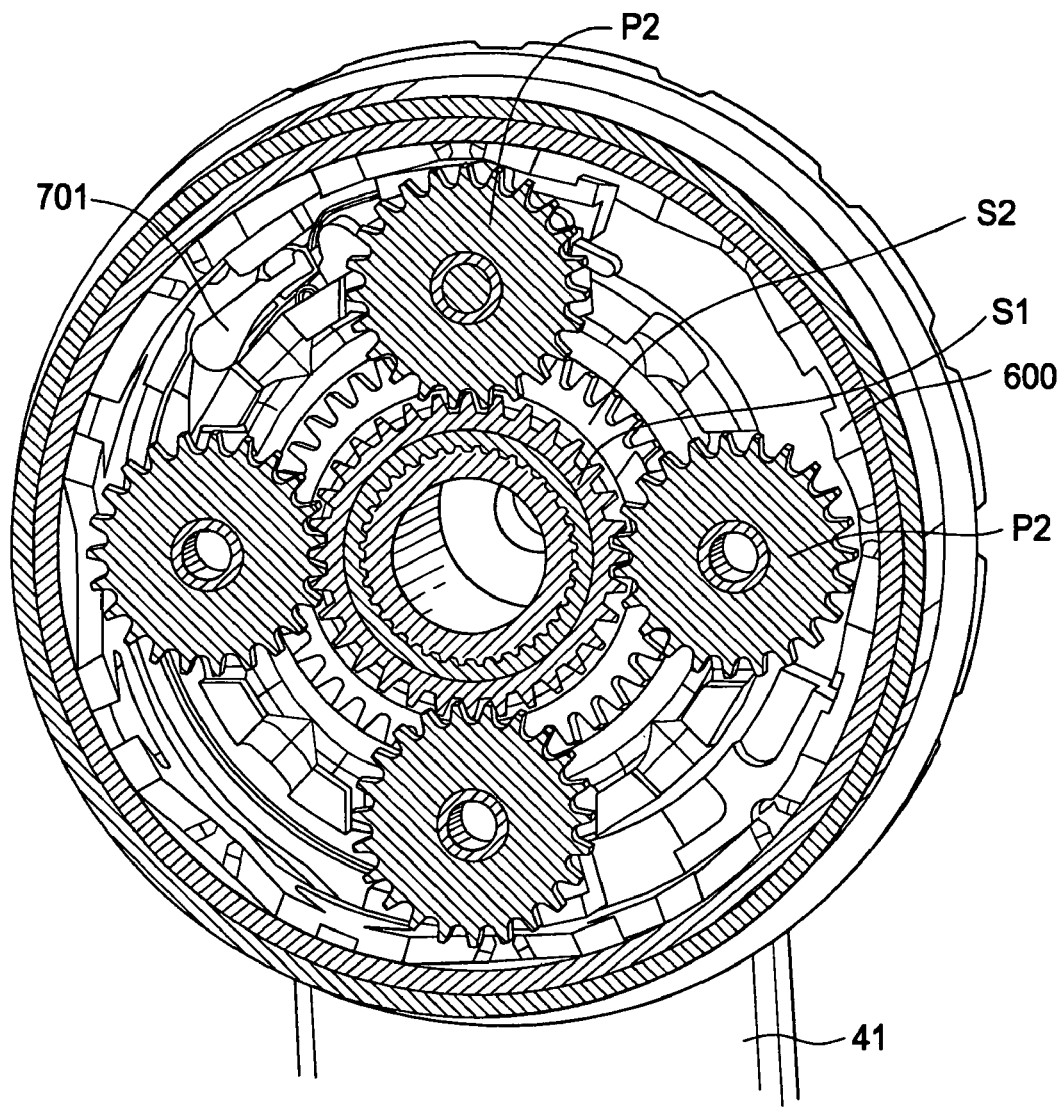
FIG. 12 is a cross-section at 12-12 in FIG. 5.

FIG. 12 is a cross-section at 12-12 in FIG. 5. Sun gear S1 has a meshing engagement with pinion gear P2. Sun gear S2 has a meshing engagement with pinion gear P3.

Figure 13:
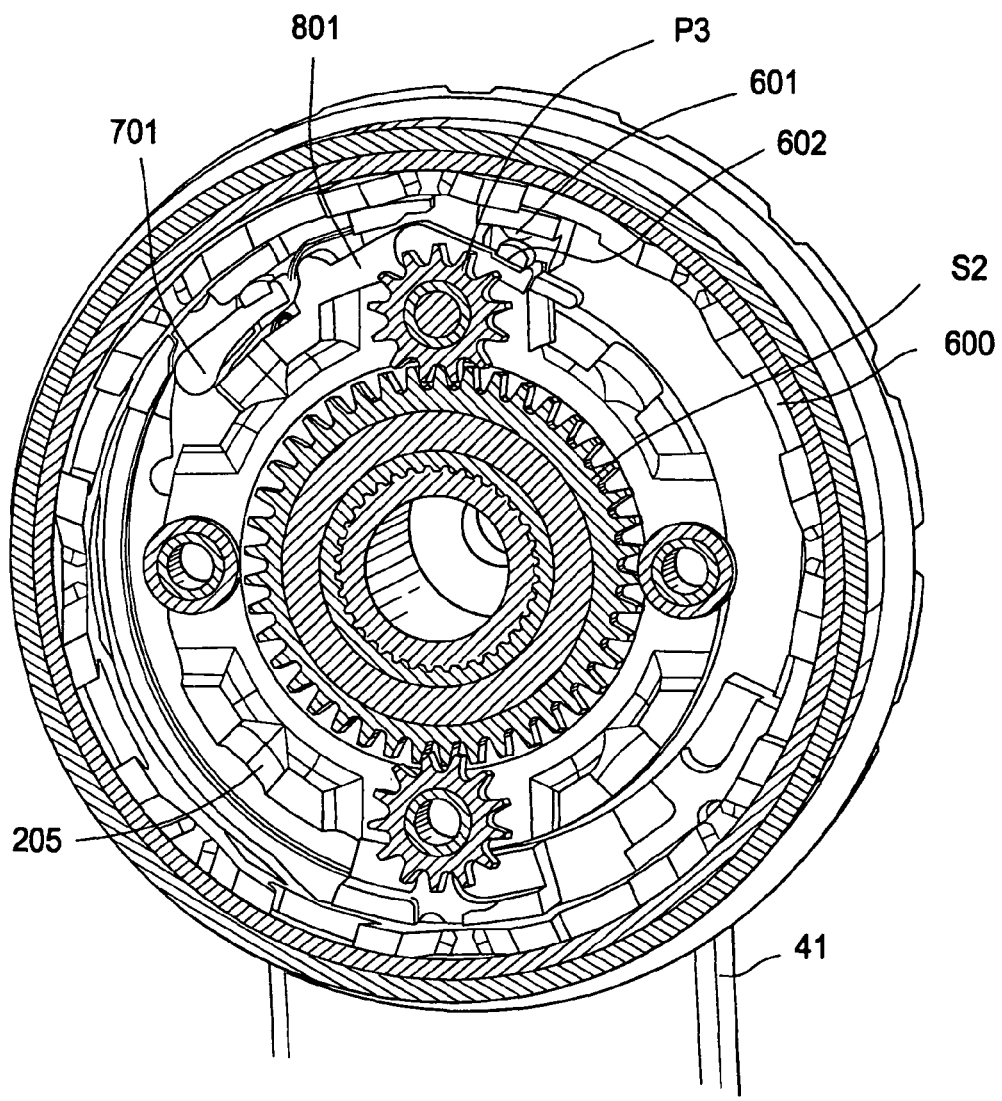
FIG. 13 is a cross-section at 13-13 in FIG. 5.

FIG. 13 is a cross-section at 13-13 in FIG. 5. Pinion gear P3 has a meshing engagement with sun gear S2.

Figure 14:
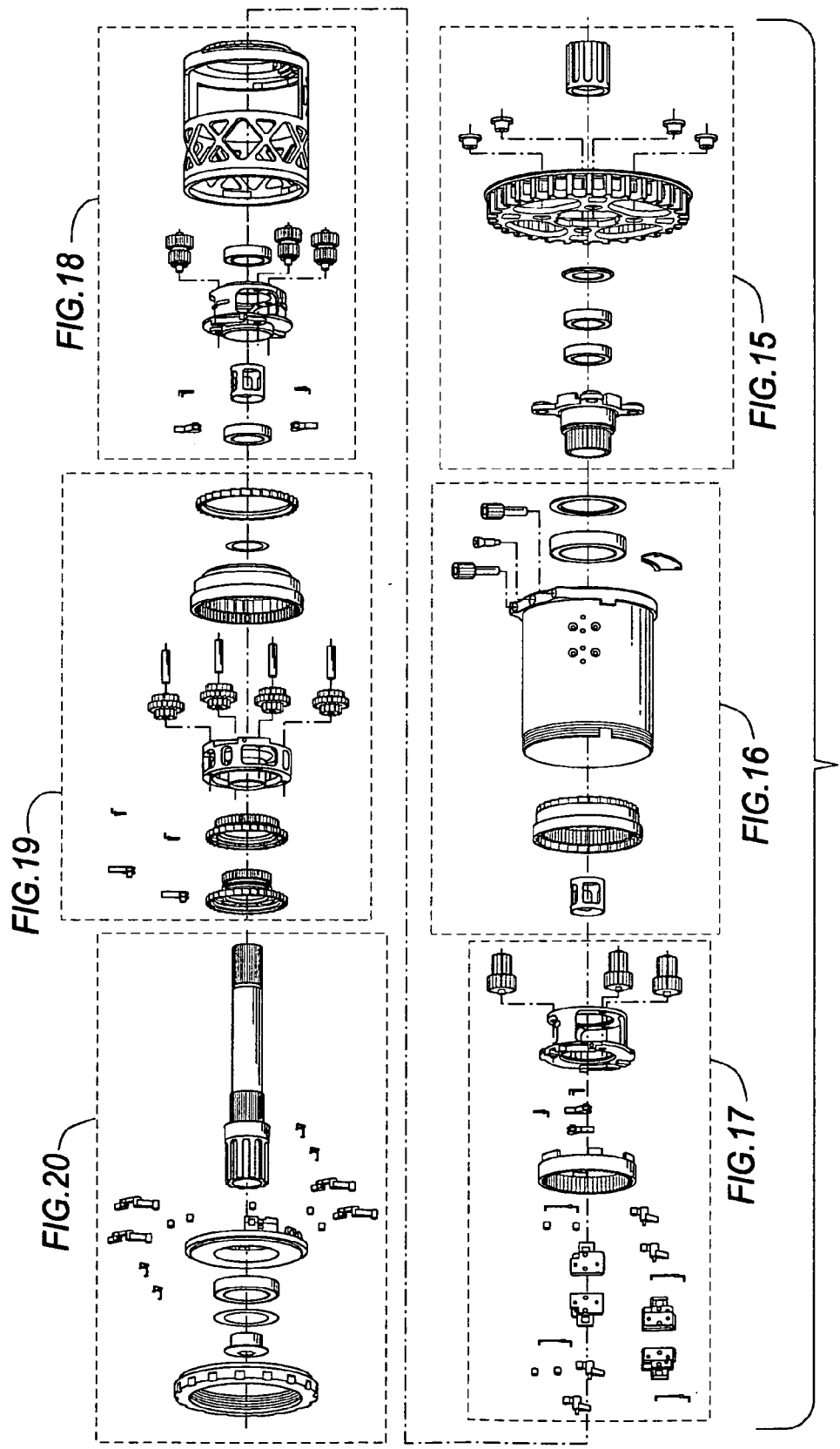
FIG. 14 is an exploded view of the transmission.

FIG. 14 is an exploded view of the transmission. Axis A-A is the axis of rotation. A belt engages sprocket 44 and a rear hub, see FIG. 4.

Transmission case 20 may be inserted into a bottom bracket in a cartridge manner. Namely, case 20 is inserted into a cylindrical receiver, the cylindrical receiver comprising the bottom bracket. In an alternate embodiment, the seat stay, seat tube and chain stays can be attached directly to case 20, for example by welding, thereby making the transmission case 20 the bottom bracket. The internals for the transmission would not be changed for either embodiment.

Figure 15:
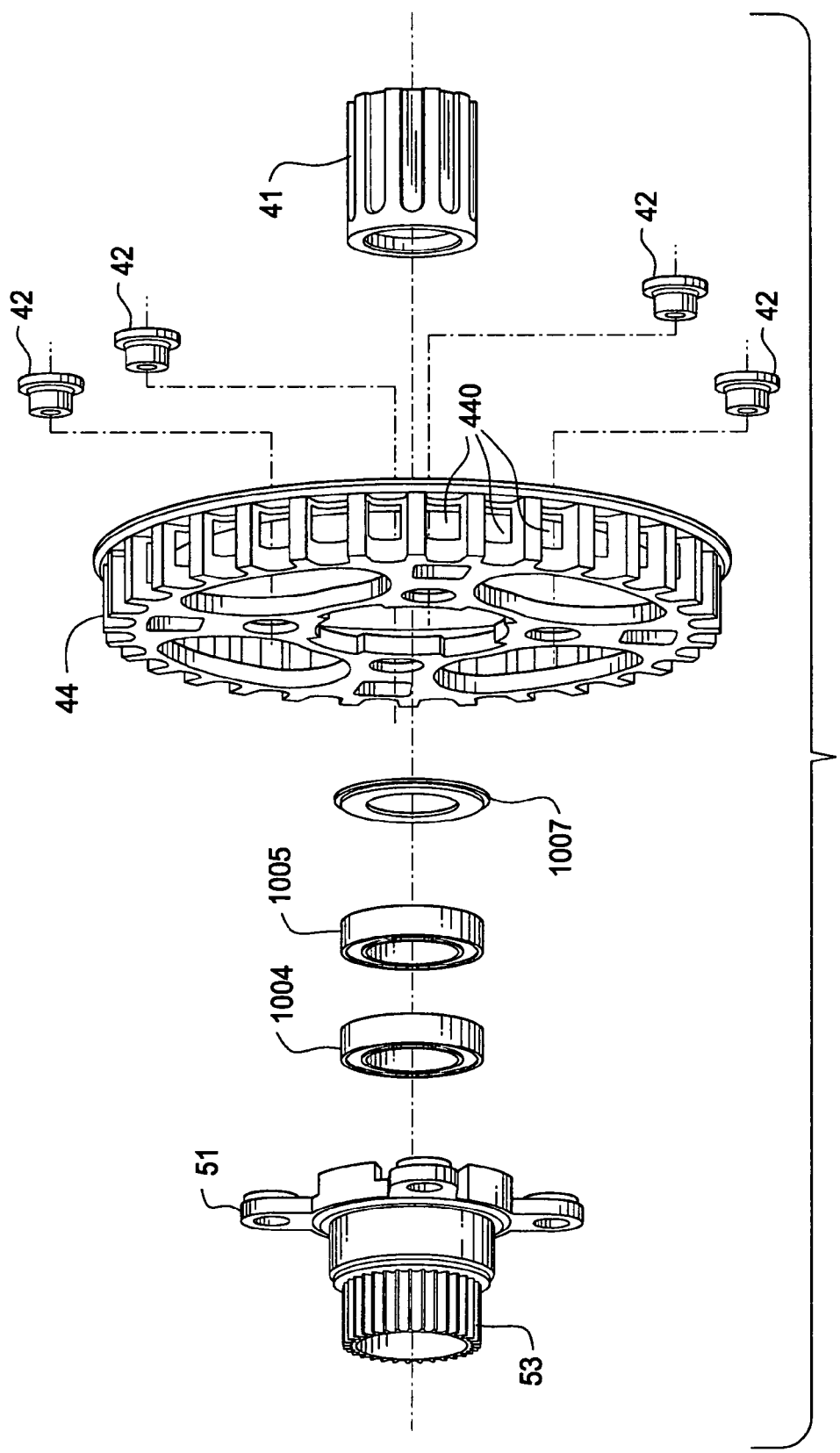
FIG. 15 is a detail of FIG. 14.

FIG. 15 is a detail of FIG. 14. Shift cables 1, 2 (known in the art) are connected to the transmission through adjusting grommets 81 and 82 respectively. Shift cables 1, 2 are typically connected to shift mechanisms on a bicycle handlebar for example (not shown). Grommets 81, 82 are threadably engaged with case 20 at hole 21, 22 respectively. Bearing 1006 is disposed between sun gear S3 and case 20.

Sprocket 44 comprises holes 440 which receive belt teeth (not shown). Further, holes 440 allow dirt and debris thrown up by the wheels to drop through the sprocket, thereby allowing the sprocket to be self cleaning. This prevents debris from accumulating between the belt and the sprocket which would otherwise hinder performance.

Bushings 1007 and 1008 engage bearings 1005 and 1006 respectively.

Spacer 800 is disposed between bearing 1004 and bearing 1003. Spacer 801 is disposed between bearing 1003 and bearing 1002.

Nuts 42 attach sprocket 41 to a spider 51 on sun gear S3.

Figure 16:
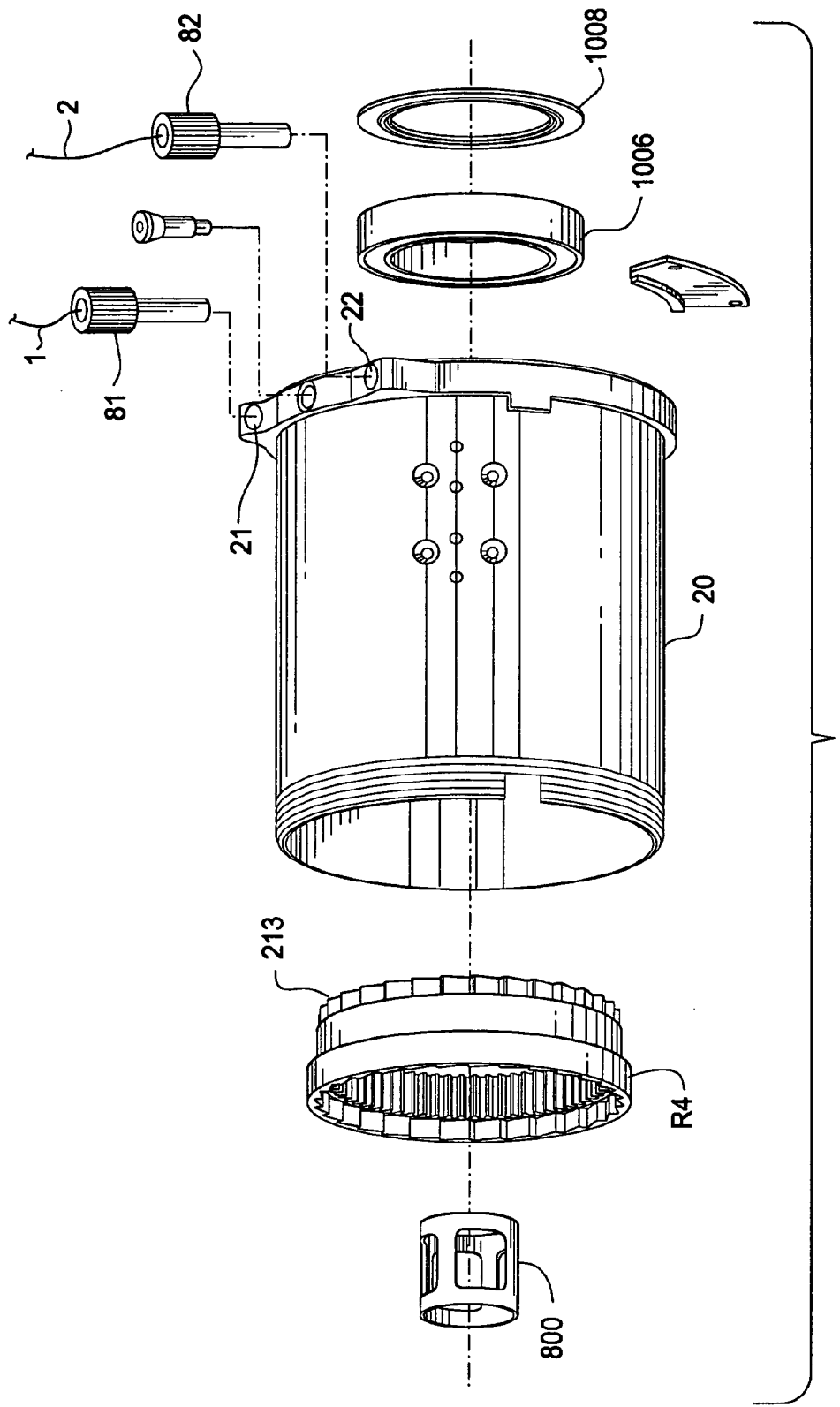
FIG. 16 is a detail of FIG. 14.

FIG. 16 is a detail of FIG. 14. Each cable 1, 2 is fastened to receiver 206. Receiver 206 is fixed to an end of shift cam ring 600. By extending or retracting each cable 1, 2 the shift cam ring is thereby rotated within the transmission case 20. The range of rotational movement of shift cam ring 600 is approximately 130°.

Surface 601A engages roller 603 which engages shift dog 702A and 802A. Surface 602A engages roller 603 which engages compliant member 601 and thereby shift dog 720, 721. Surface 603A engages roller 603 which engages shift dog 702B, 802B. Surface 601B engages roller 603 which engages shift dogs 820, 821.

Shift dogs 720 and 721 engage teeth 212. Shift dogs 820, 821 engage teeth 213.

Springs 8001A, 8001B, 8001C, 8001D bias each shift dog 720, 721, 820, 821 into engagement with teeth 212, 213 respectively. Biasing the shift dogs causes the rollers 603 to maintain contact with cam surfaces 601A, 602A, 603A and 601B.

Figure 17:
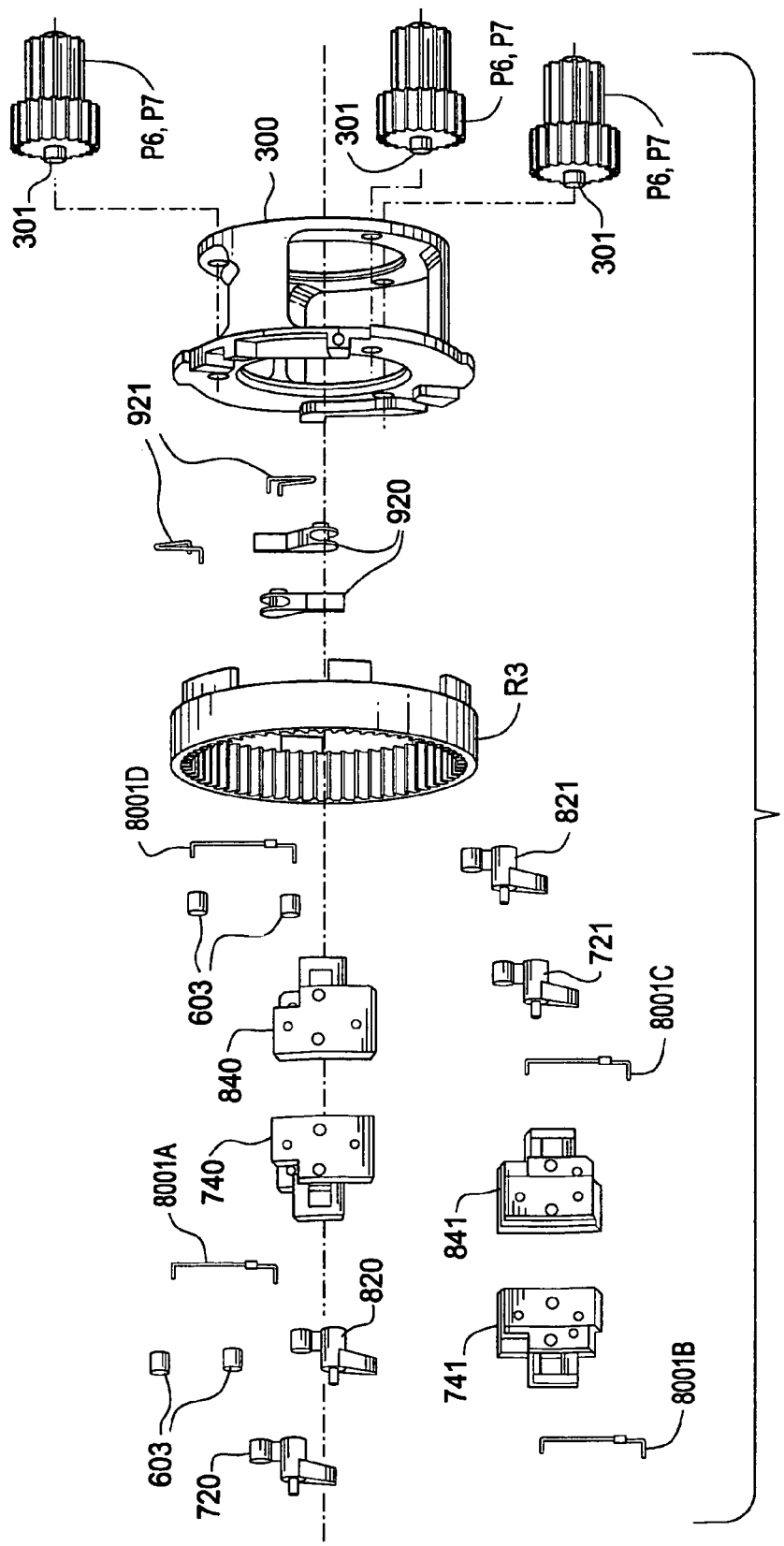
FIG. 17 is a detail of FIG. 14.

FIG. 17 is a detail of FIG. 14. Bushing 1010 engages bearing 1002. Shift dogs 701A, 801A engage teeth 211. Shift dogs 701B, 801B engage teeth 210.

Figure 18:
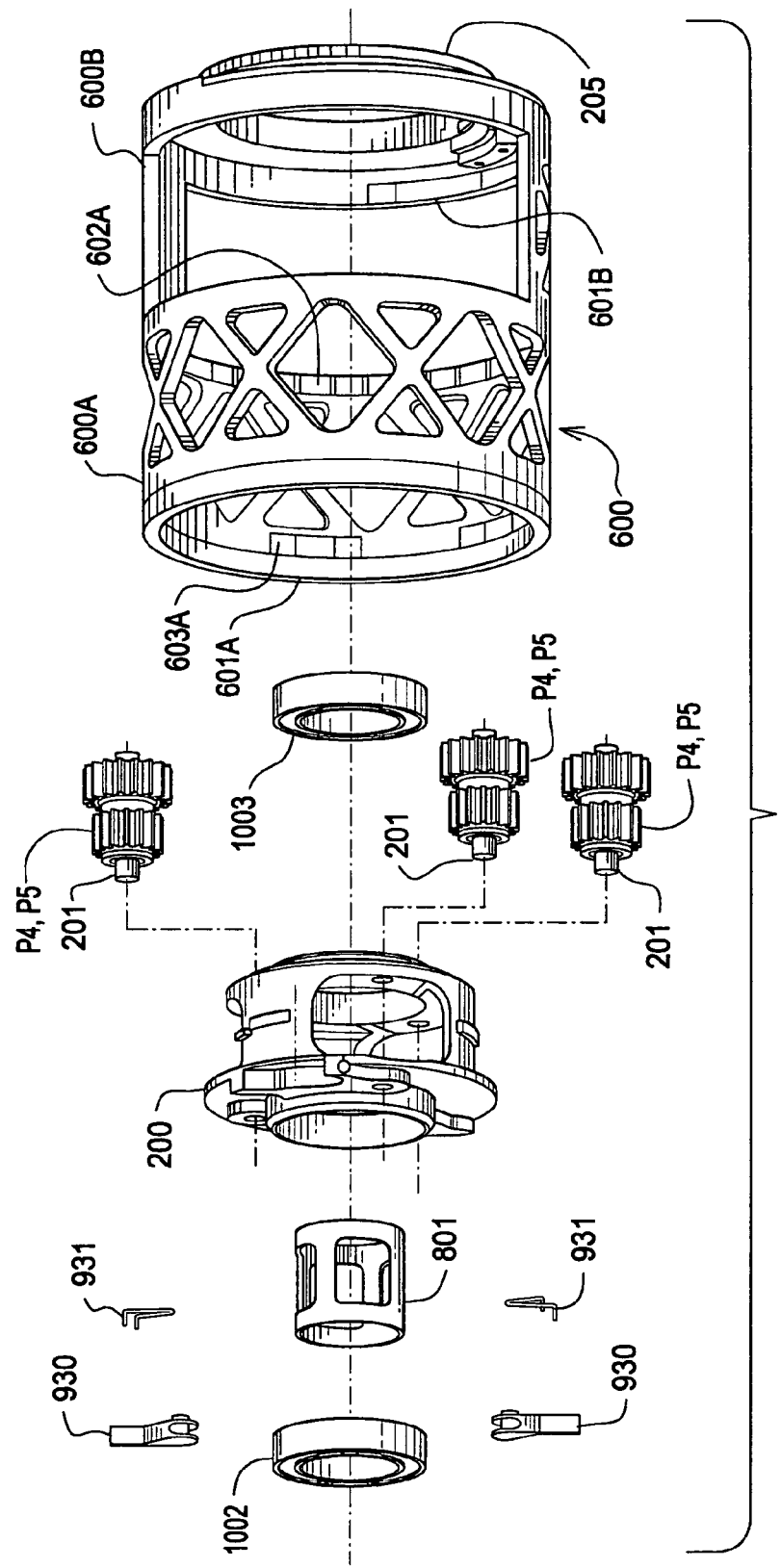
FIG. 18 is a detail of FIG. 14.
Figure 19:
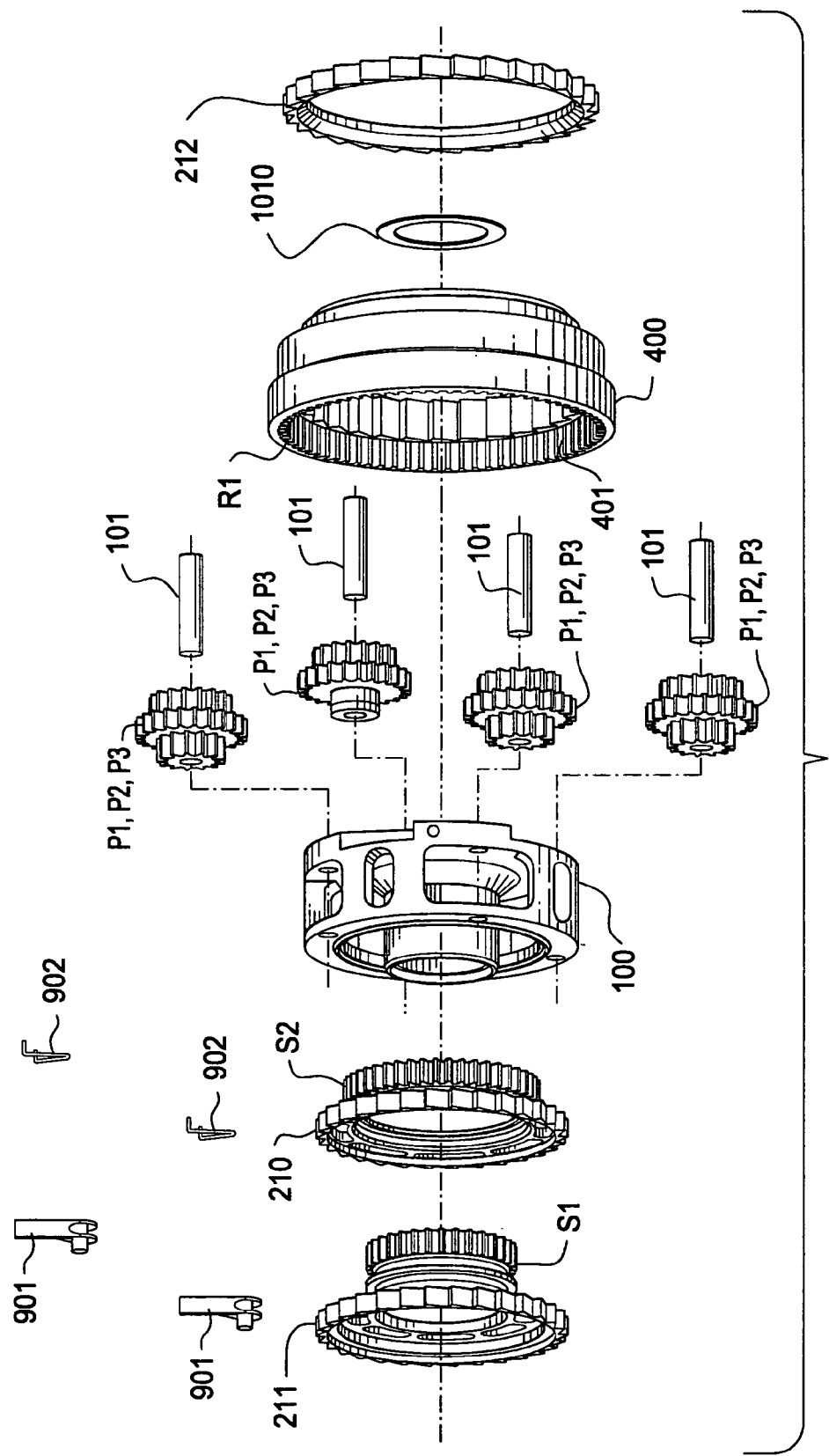
FIG. 19 is a detail of FIG. 14.

FIG. 18 is a detail of FIG. 14. FIG. 19 is a detail of FIG. 14. FIG. 20 is a detail of FIG. 14. Threaded ring 23 attaches end 205 to case 20. Bushing 1009 engages bearing 1001. Cap 43 retains crank arms (not shown) to axle shaft 22.

Springs 7001A, 7001B, 7001C, 7001D bias each shift dog 701A, 801A, 701B, 801B into engagement with teeth 211, 210 respectively.

Figure 21:
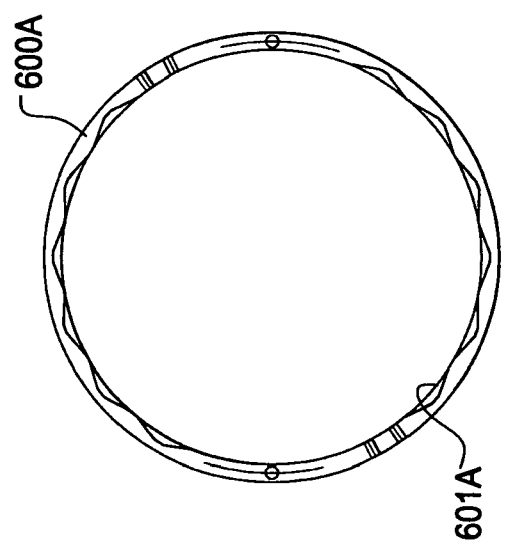
FIG. 21 is an end view of shift cam ring 600.

FIG. 21 is an end view of shift cam ring 600. Shift cam ring 600 comprises member 600A and 600B for ease of manufacture and assembly. Member 600A is cylindrical. Shift cam ring 600 is disposed in the transmission and is radially outermost from the planetary gear sets 100, 200, 300 and within the transmission case 20, see FIG. 5.

Figure 22:
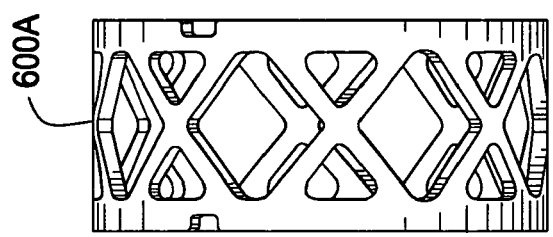
FIG. 22 is a side view of the shift cam ring 600.

FIG. 22 is a side view of the shift cam ring 600. Member 600A is shown having a lattice structure in order to reduce weight while maintaining strength. Shift cam ring 600 is rotatable within transmission case 20.

Figure 23:
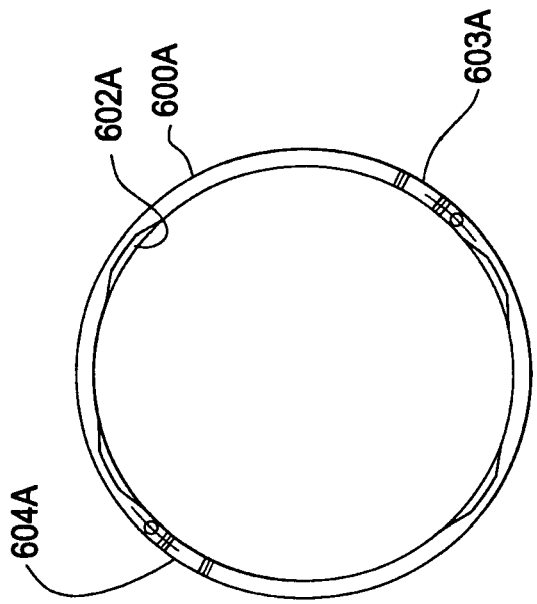
FIG. 23 is an end view of shift cam ring 600.

FIG. 23 is an end view of shift cam ring 600.

Figure 24:
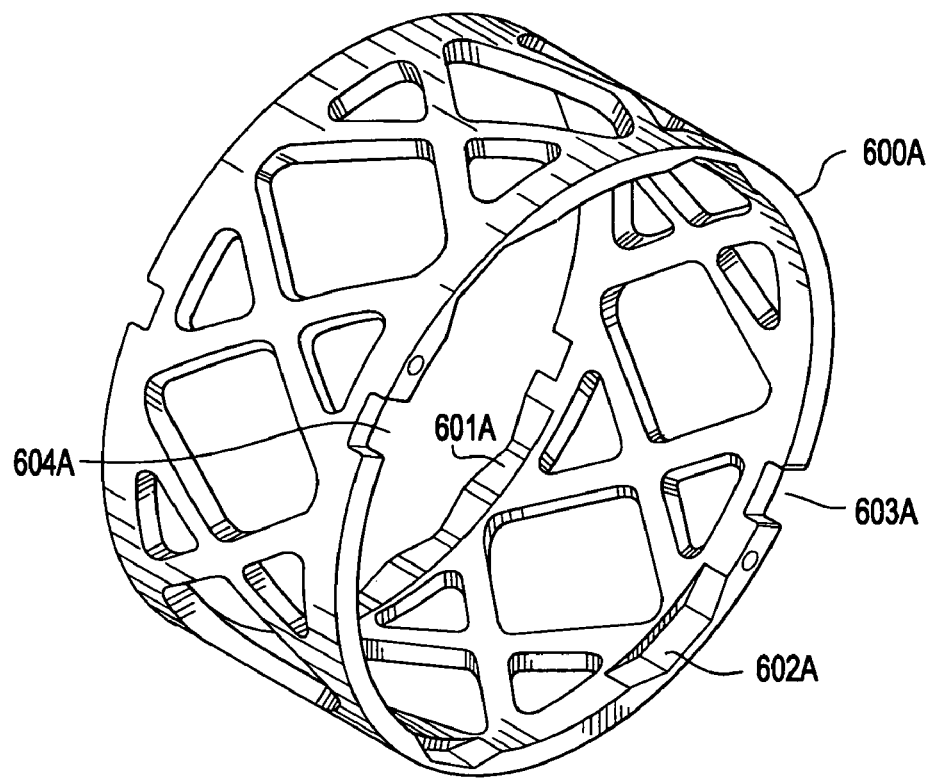
FIG. 24 is a perspective view of shift cam ring 600.

FIG. 24 is a perspective view of shift cam ring 600. Each shift circumferential surface 601A and 602A is disposed at opposite ends of member 600A. Each surface 601A and 602A comprises a radially inward surface of the shift cam ring 600.

Circumferential surface 601A comprises a plurality of features each having a differing slope or radius. A radial position of rollers 603 engaging compliant member 601 thereby shift dog 702A and 802A is each determined according to which surface of 601A is engaging rollers 603.

Circumferential surface 602A comprises a plurality of features each having a differing slope or radius. A radial position of rollers 603 engaging compliant member 601 and thereby shift dog 720 and 721 is each determined according to which surface of 602A is engaging rollers 603.

Circumferential surface 603A comprises a plurality of features each having a differing slope or radius. A radial position of rollers 603 engaging compliant member 601 and thereby shift dog 702B and 802B is each determined according to which surface of 603A is rollers 603.

Circumferential surface 601B comprises a plurality of features each having a differing slope or radius. A radial position of rollers 603 engaging compliant member 601 and thereby shift dog 820 and 821 is each determined according to which surface of 601B is engaging rollers 603. 602. Each surface 603A and 601B comprises a radially inward surface of the shift cam ring 600.

Figure 25:
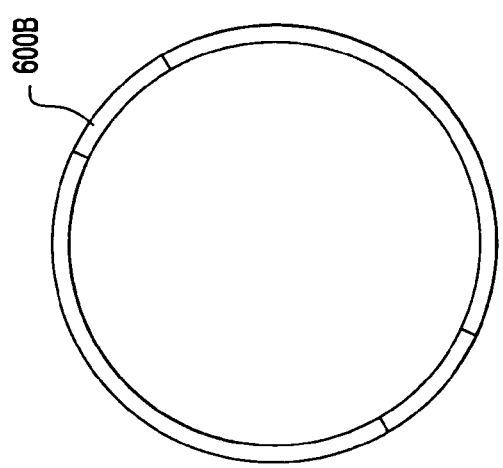
FIG. 25 is an end view of shift cam ring.

FIG. 25 is an end view of shift cam ring. Shift cam ring 600 comprises member 600A and 600B for ease of manufacture and assembly. Member 600B is cylindrical. Shift cam ring 600 is disposed in the transmission outermost from the planetary gear sets and within the transmission case 20, see FIG. 5. The transmission is shifted by rotation of the shift cam ring 600 through extension and retraction of shift cables 1, 2 see FIG. 14.

Figure 26:
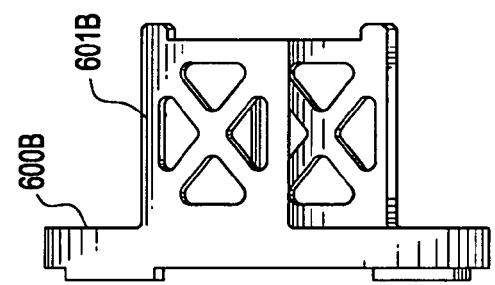
FIG. 26 is a side view of the shift cam ring.

FIG. 26 is a side view of the shift cam ring.

Figure 27:
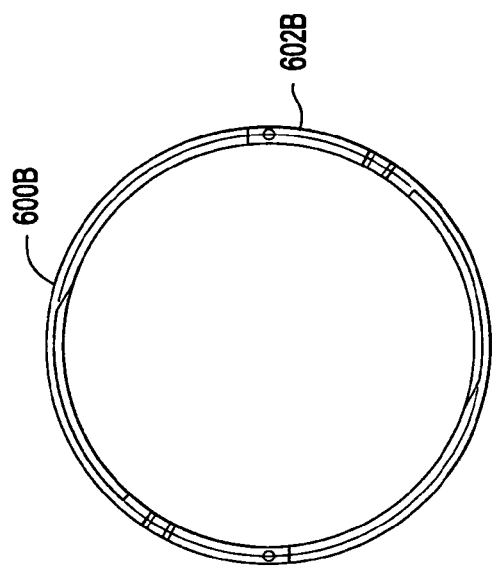
FIG. 27 is an end view of shift cam ring.

FIG. 27 is an end view of shift cam ring.

Figure 28:
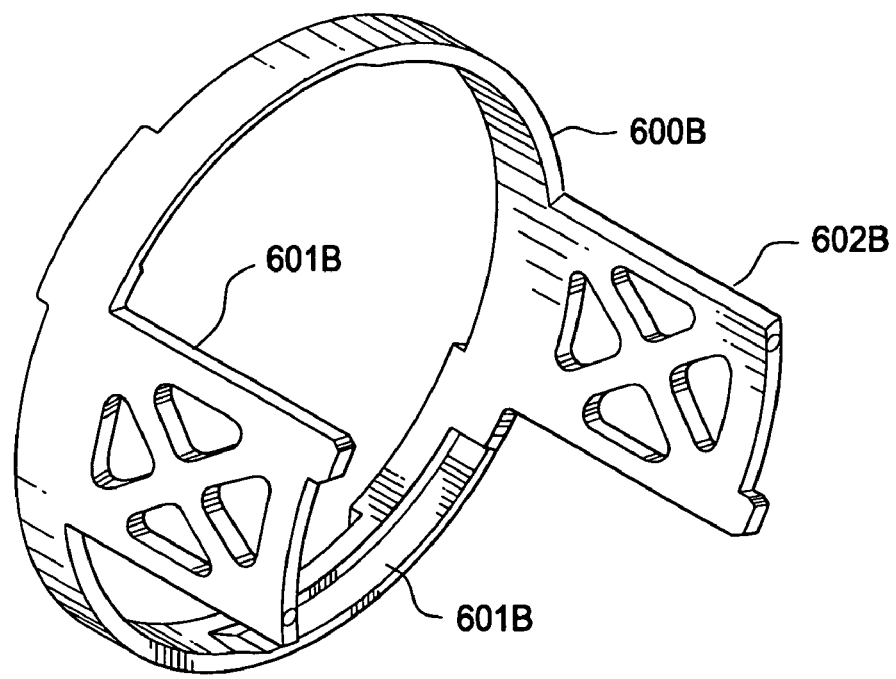
FIG. 28 is a perspective view of the shaft cam ring.

FIG. 28 is a perspective view of the shaft cam ring. Member 600B comprises extended members 601B and 602B. each member 601B and 602B engages a cooperating portion of 600A, namely, slots 603A and 604A.

Figure 29:
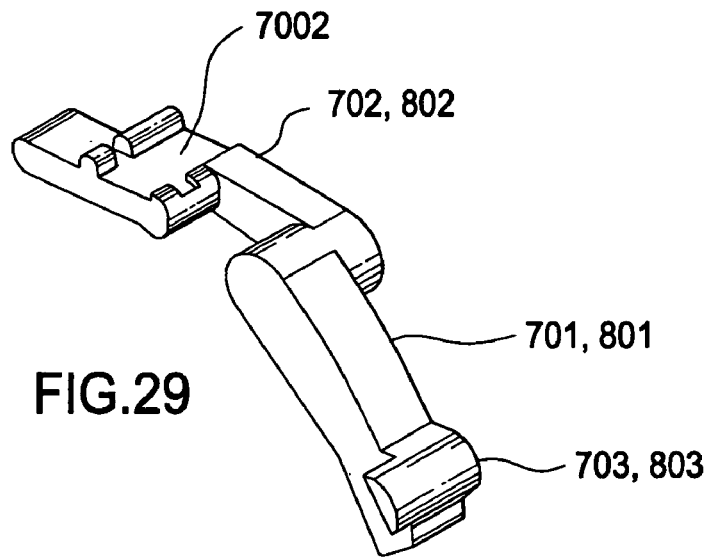
FIG. 29 is a perspective view of a shift dog.

FIG. 29 is a perspective view of a shift dog. Portion 7002 receives member 601. Member 601 comprises a resilient material which can be compressed and will rebound when the compression is released.

Each shift dog 701, 801 and 702, 802 is identical to the others. For each shift dog 702, 802 a member 602 is fixed to portion 7002.

Figure 30:
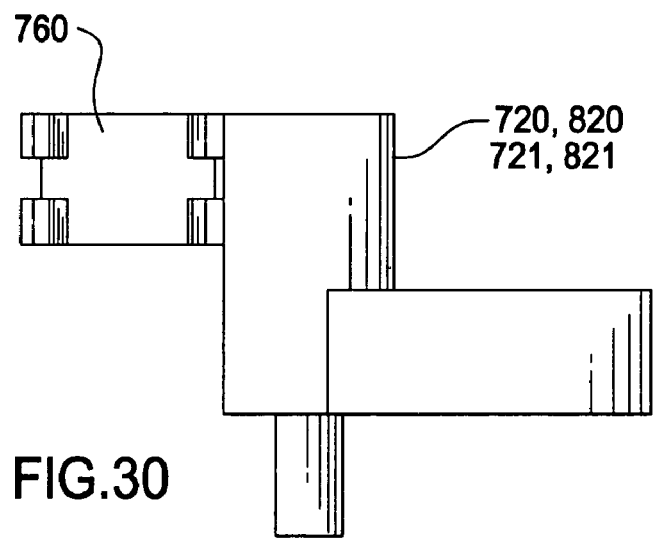
FIG. 30 is a plan view of a shaft dog.

FIG. 30 is a plan view of a shift dog. Receiving portion 760 receives a member 601. Each shift dog 720, 820, 721, 821 is identical to the others. For each shift dog 720, 820, 721 and 821 a member 602 is fixed to portion 760.

Figure 31:
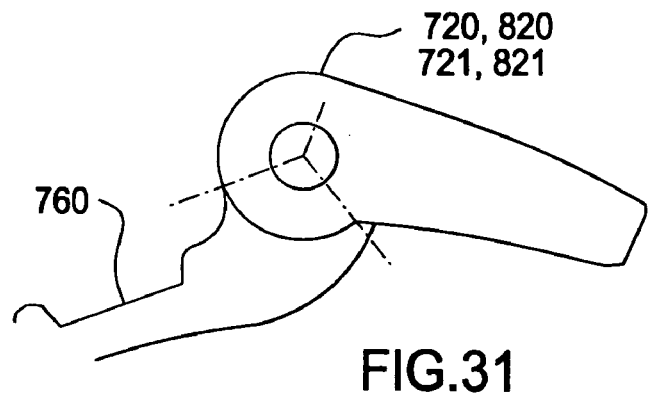
FIG. 31 is a side view of a shift dog.

FIG. 31 is a side view of a shift dog. Receiving portion 760 receives a member 601.

Figure 32:
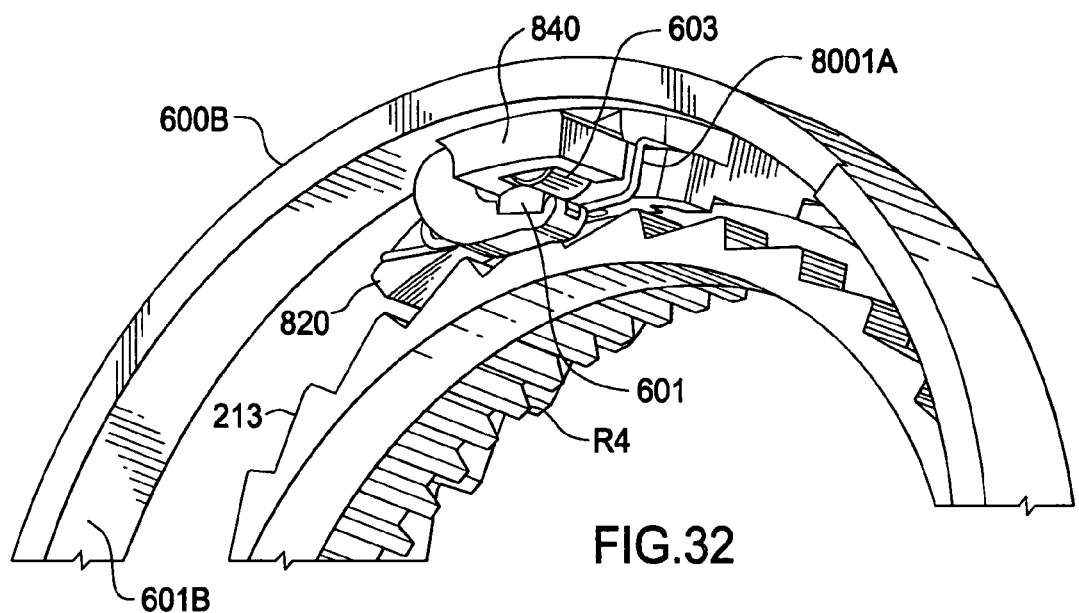
FIG. 32 is a perspective view of a shift dog.

FIG. 32 is a perspective view of a shift dog. Shift dog 820 is pivotally mounted to a dog mount 840. Dog mount 840 is fastened to case 20 (not shown). A roller 603 is disposed between surface 601B and member 601.

Figure 33:
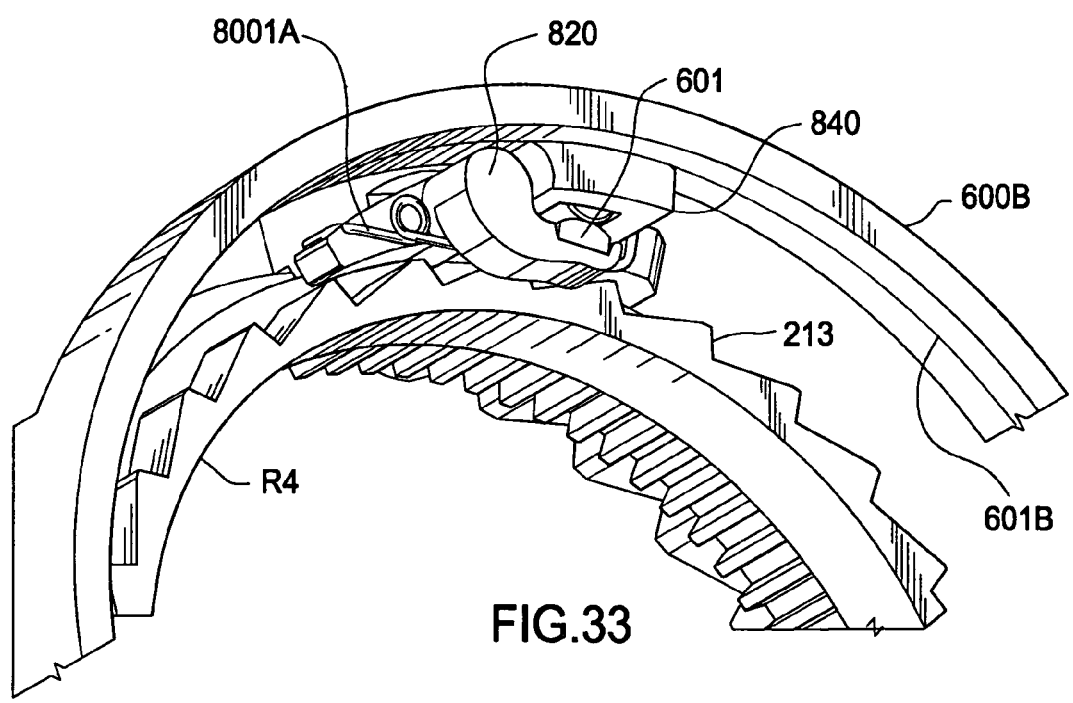
FIG. 33 is a perspective view of a shift dog.

FIG. 33 is a perspective view of a shift dog. Spring 8001A biases shift dog 820 toward teeth 213.

Figure 34:
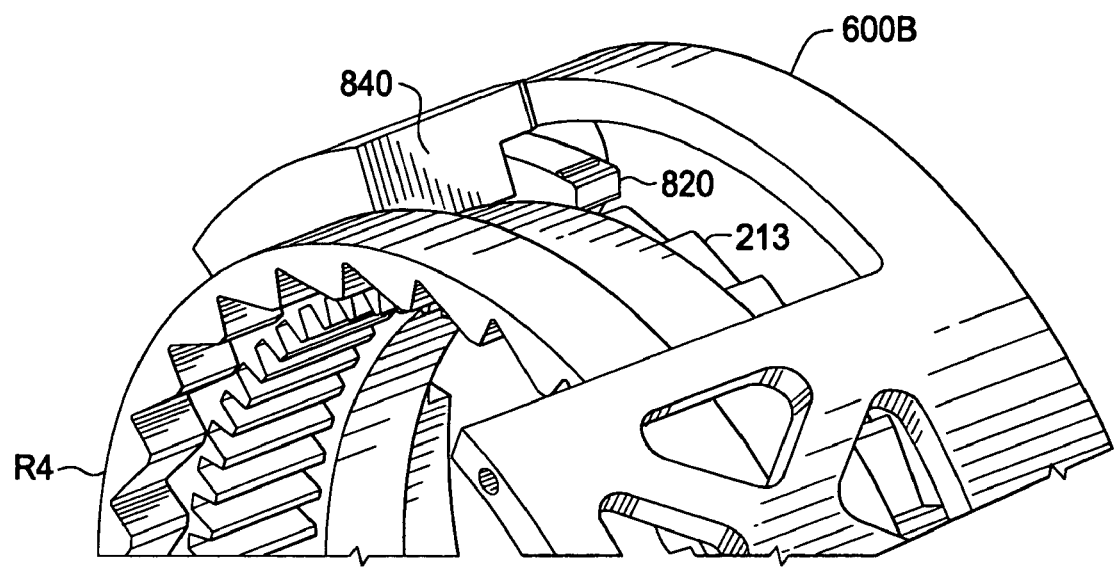
FIG. 34 is a perspective view of a shift dog.

FIG. 34 is a perspective view of a shift dog. Shift dog 840 is fastened to case 20.

Figure 35:
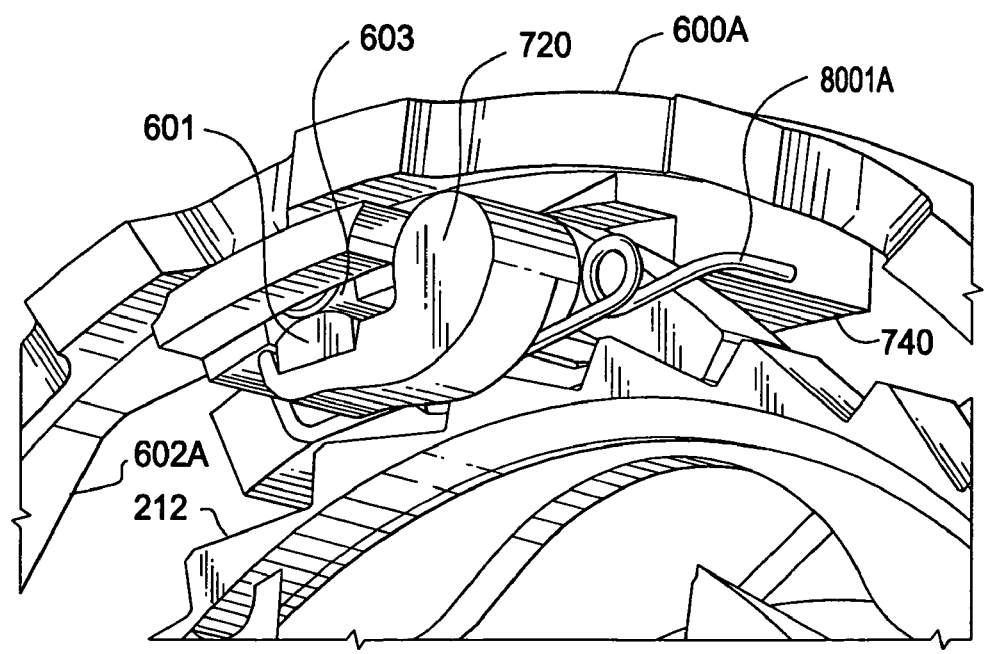
FIG. 35 is a perspective view of a shift dog.

FIG. 35 is a perspective view of a shift dog. Shift dog 720 is pivotally mounted to dog mount 740. Spring 8001A biases shift dog 720 toward teeth 212. A roller 603 is disposed between a surface 602A and a member 601.

Figure 36:
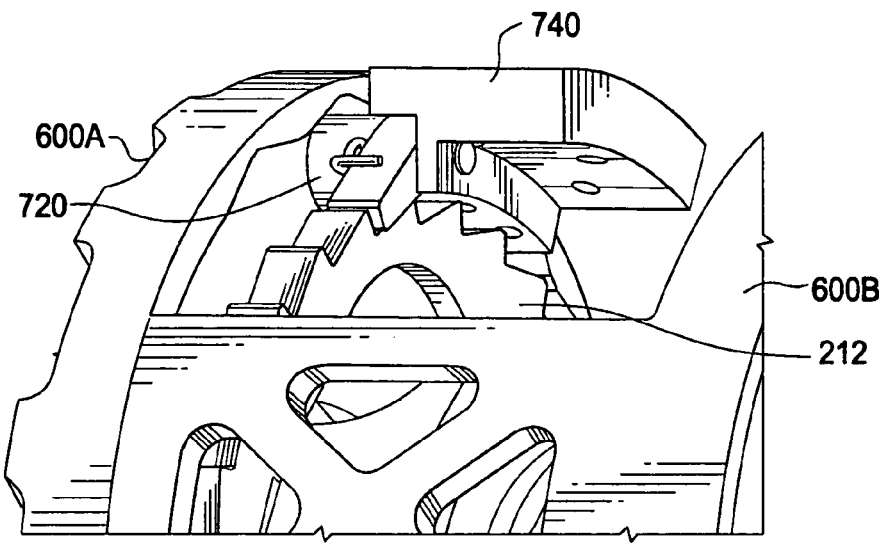
FIG. 36 is a perspective view of a shift dog.

FIG. 36 is a perspective view of a shift dog. Dog mount 740 is fastened to case 20.

Figure 37:
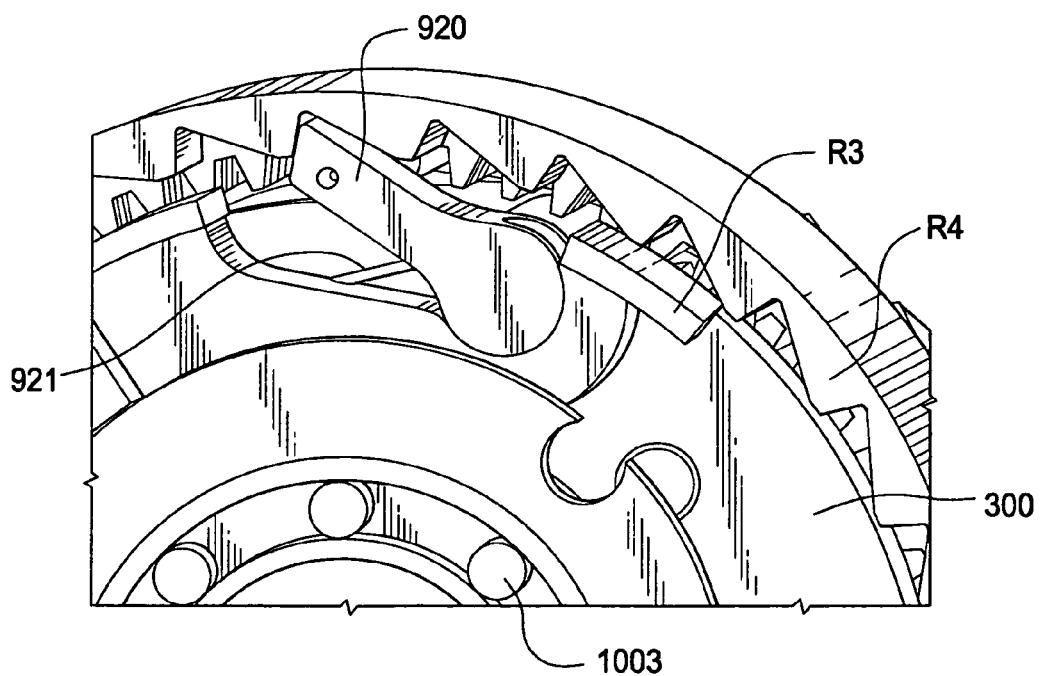
FIG. 37 is a detail of FIG. 18.

FIG. 37 is a detail of FIG. 18. One way clutch dog 920 is pivotally mounted to carrier 300. Spring 921 biases one way clutch dog 920 against teeth 213 of ring gear R4. One way clutch dog 920 allows a reverse rotational movement of ring gear R4 by disengaging teeth 213. Depending upon the particular gear that is engaged, the one way clutch is the "free wheel" feature of the transmission which allows a rider to stop pedaling and coast. A second identical one way clutch dog is disposed opposite that shown in FIG. 37, thereby forming a pair of one way clutch shift dogs.

Figure 38:
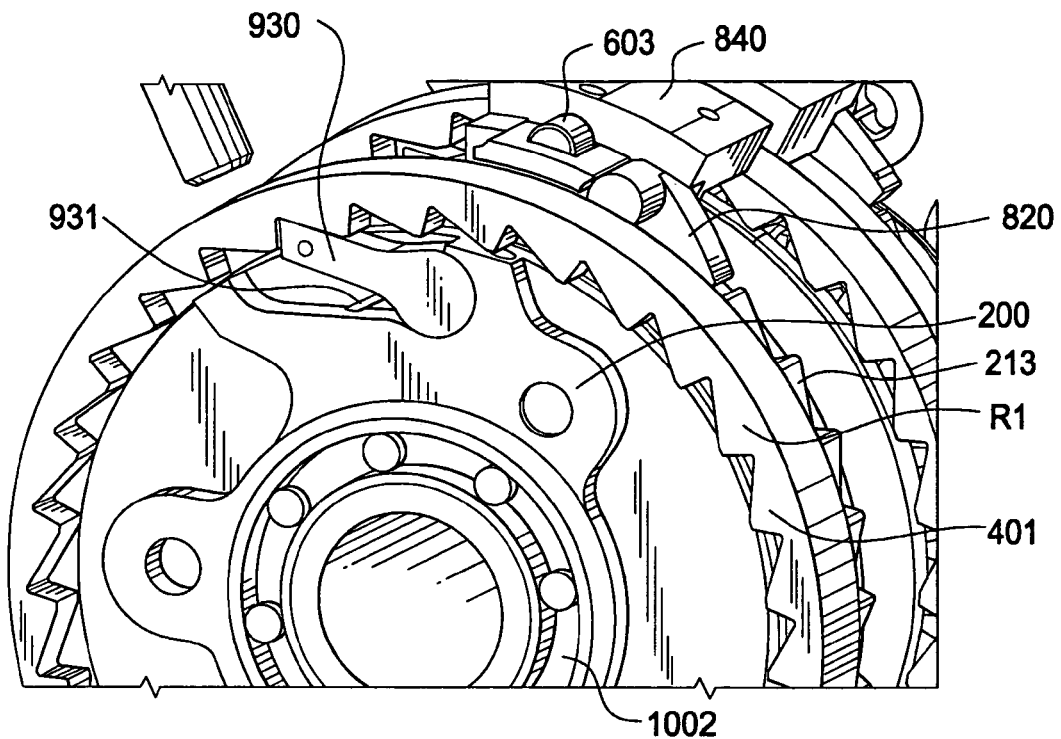
FIG. 38 is a detail of FIG. 19.

FIG. 38 is a detail of FIG. 19. One way clutch dog 930 is pivotally mounted to carrier 200. Spring 931 biases one way clutch dog 930 against teeth 401 of ring gear R1. One way clutch dog 930 prevents a reverse rotational movement of ring gear R1 by engaging teeth 401. One way clutch dog 930 allows a forward rotational movement of ring gear R1 relative to carrier 200 by disengaging from teeth 401. Depending upon the particular gear that is engaged, the one way clutch is the "free wheel" feature of the transmission which allows a rider to stop pedaling and coast. A second identical one way clutch dog is disposed opposite that shown in FIG. 38, thereby forming a pair of one way clutch shift dogs.

Figure 39:
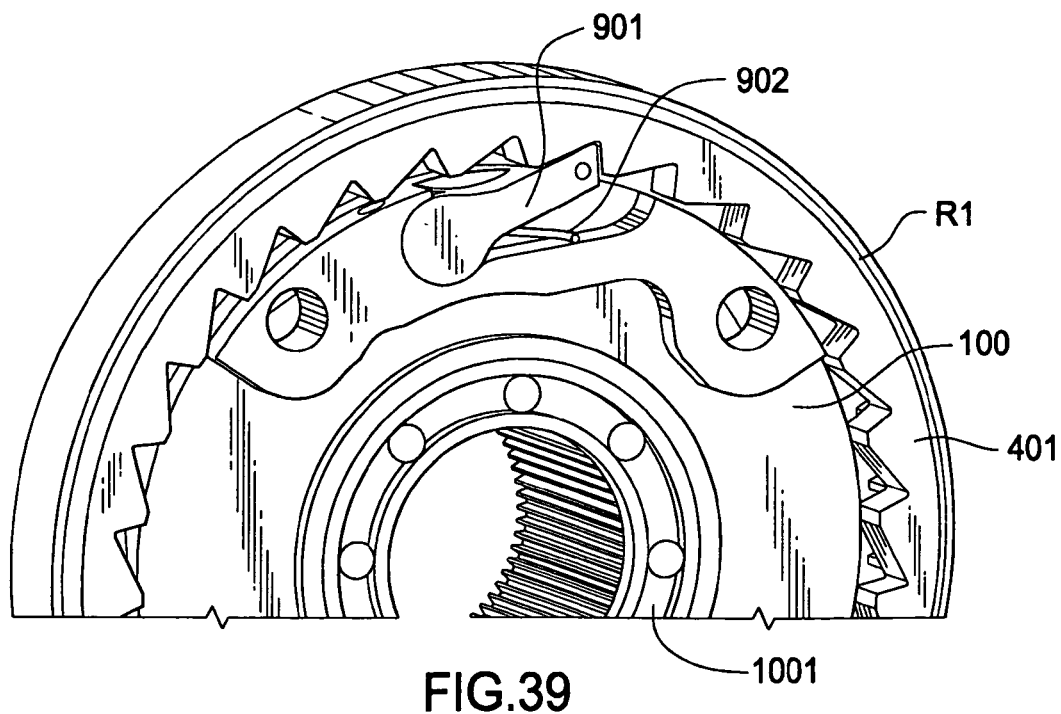
FIG. 39 is a detail of FIG. 19.

FIG. 39 is a detail of FIG. 19. One way clutch dog 901 is pivotally mounted to carrier 100. Spring 902 biases one way clutch dog 901 against teeth 401 of ring gear R1. One way clutch dog 901 allows forward rotational movement of ring gear R1 relative to carrier 100 by disengaging teeth 401. One way clutch dog 901 prevents a reverse rotational movement of ring gear R1 by engaging teeth 401. Depending upon the particular gear that is engaged, the one way clutch is the "free wheel" feature of the transmission which allows a rider to stop pedaling and coast. A second, identical one way clutch dog is disposed opposite that shown in FIG. 39, thereby forming a pair of one way clutch shift dogs.

Figure 40:
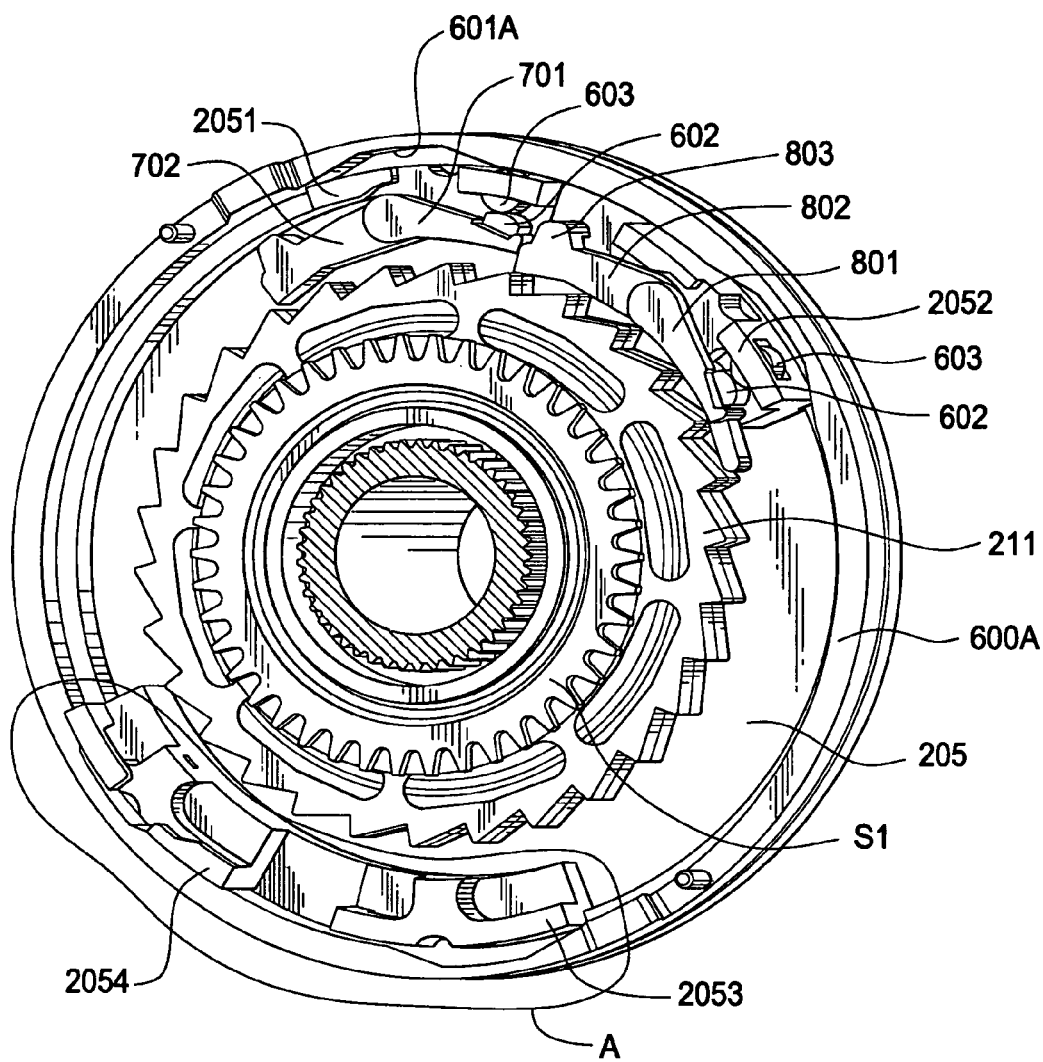
FIG. 40 is a detail of FIG. 6.

FIG. 40 is a detail of FIG. 6. Roller 603 engages surface 601A, thereby pressing upon member 602 which in turn presses shift dog 701, thereby disengaging shift dog 702 from teeth 210.

Use of resilient member 602 allows the shift cams to rotate while the shift dog is still engaged with the teeth. The cams can rotate and compress the resilient member while the dog is engaged with the teeth and compressively loaded. When a bicycle rider pedals a bicycle, the torque input into the transmission is cyclic as the input shifts from one pedal to the other. Even for the very best cyclists, the input torque drops to zero or near zero during this transfer of input from one pedal the other. Due to the cyclic input loading of a pedaling bicycle rider, when the torque momentarily approaches or reaches zero, the force on the shift dog/tooth interface also drops to zero or near zero, it is at this moment that the shift dog will rotate out of engagement due to the resilient member's desire to return to a relaxed state. This gives the rider the impression of being able to shift under load while in actuality the shift occurs under near no load conditions.

A duplicate set of shift dogs as described in this FIG. 38 are likewise mounted in area "A". All shift dogs 701, 702, 801, 802 are pivotally mounted to member 205 at mounting portions 2051, 2052, 2053, 2054 respectively.

Figure 41:
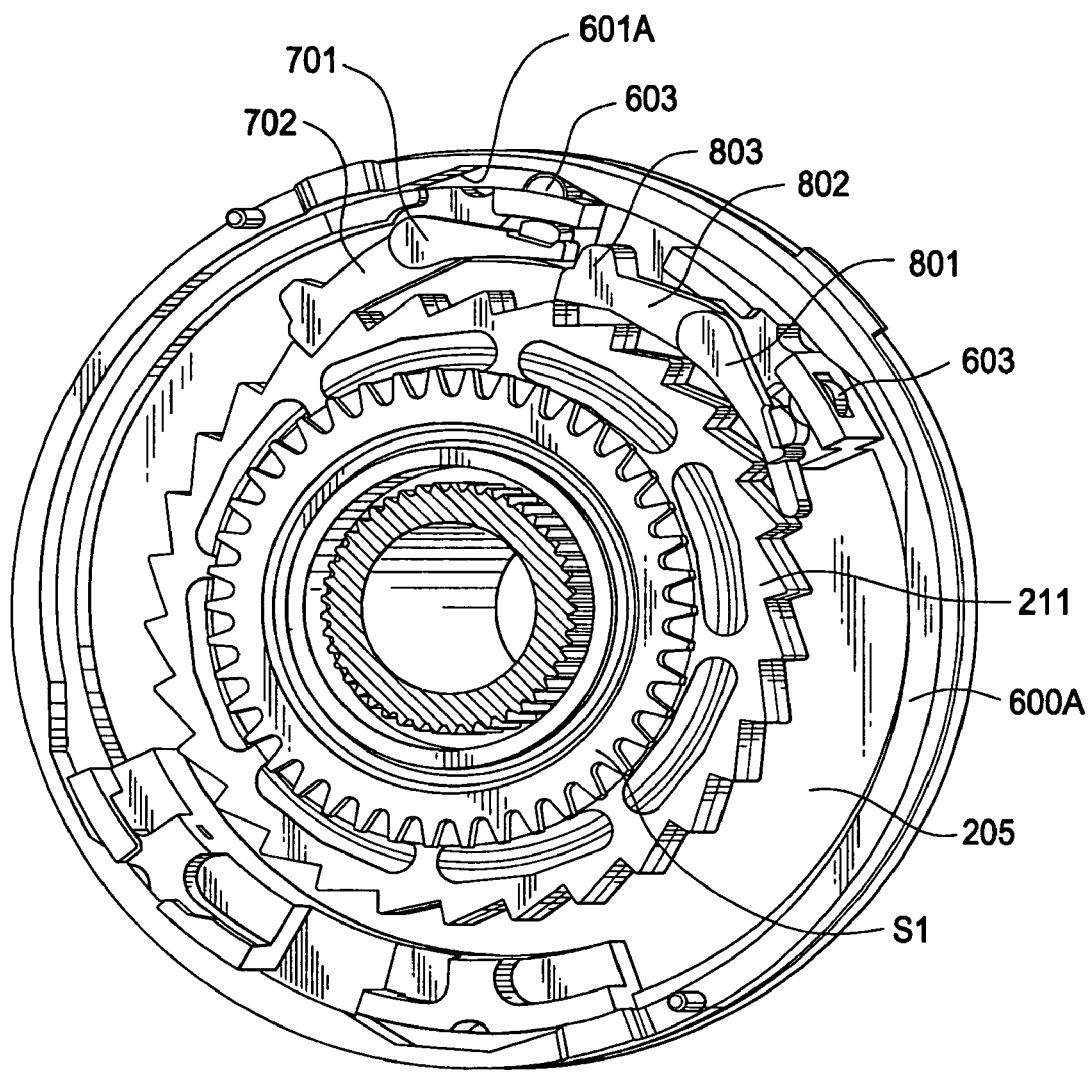
FIG. 41 is a detail of FIG. 6.

FIG. 41 is a detail of FIG. 6. Shift dog 701 is allowed to move radially outward by a movement of roller 601, which roller follows surface 601A as surface 601A is rotated during a shift by a rider. Shift dog 702 is shown fully engaged with teeth 210. Shift dog 701 cooperatively engages protrusion 803, which in turn allows shift dog 702 to pivot and thereby engage teeth 210. Spring 7001A urges shift dog 801 into engagement with roller 601, and thereby said roller 601 into surface 601A. Shift dogs 802 and 702 are able to pivot independently of each other, but because of the cooperative arrangement of protrusion 803 and shift dog 701, they cannot both engage with the teeth of their respective sun gears at the same time. If shift dog 702 is engaged with teeth 210, then the relation of protrusion 803 and shift dog 701 prevents shift dog 802 from engaging teeth 211. Conversely, if shift dog 802 is engaged with teeth 211, shift dog 702 cannot pivot to engage with teeth 210.

Figure 42:
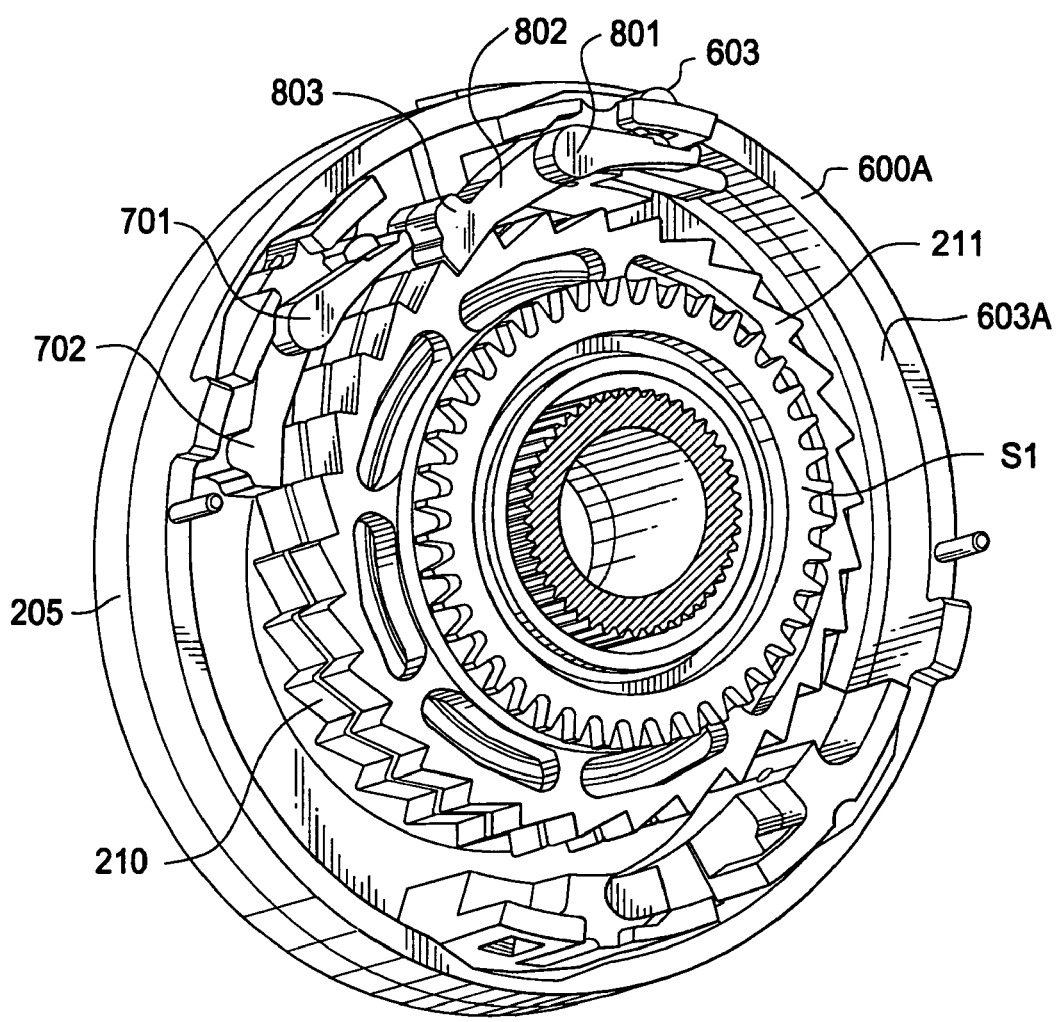
FIG. 42 is a detail of FIG. 6.

FIG. 42 is a detail of FIG. 6. Since shift dog 701 is fully pressed by roller 603, shift dog 702 is fully disengaged from teeth 210. Shift dog 701 cooperatively engages protrusion 803, which in turn prevents shift dog 702 from pivoting to engage teeth 210. Protrusion 803 is positioned radially above shift dog 701. If shift dog 701 rotates to engage teeth 210, shift dog 802 is held out of engagement with teeth 211 as shown in FIG. 39. Shift dog 802 is prevented from engaging teeth 211 by the cooperative arrangement of protrusion 803 and shift dog 701.

When shift dog 802 is engaged with teeth 211 as shown in FIG. 40 shift dog 702 is prevented from engaging teeth 210 by the arrangement of protrusion 803 and shift dog 701. Both shift dogs 702 and 802 can be disengaged from teeth 210 and 211 simultaneously. Shift dogs 702, 802 are prevented from engaging the teeth simultaneously by the cooperative arrangement of protrusion 803 and shift dog 701. Each protrusion 703, 803 is identical to the other. Protrusion 703 extends from the end of shift dog 701. Protrusion 803 extends from the end of shift dog 801.

Figure 43:
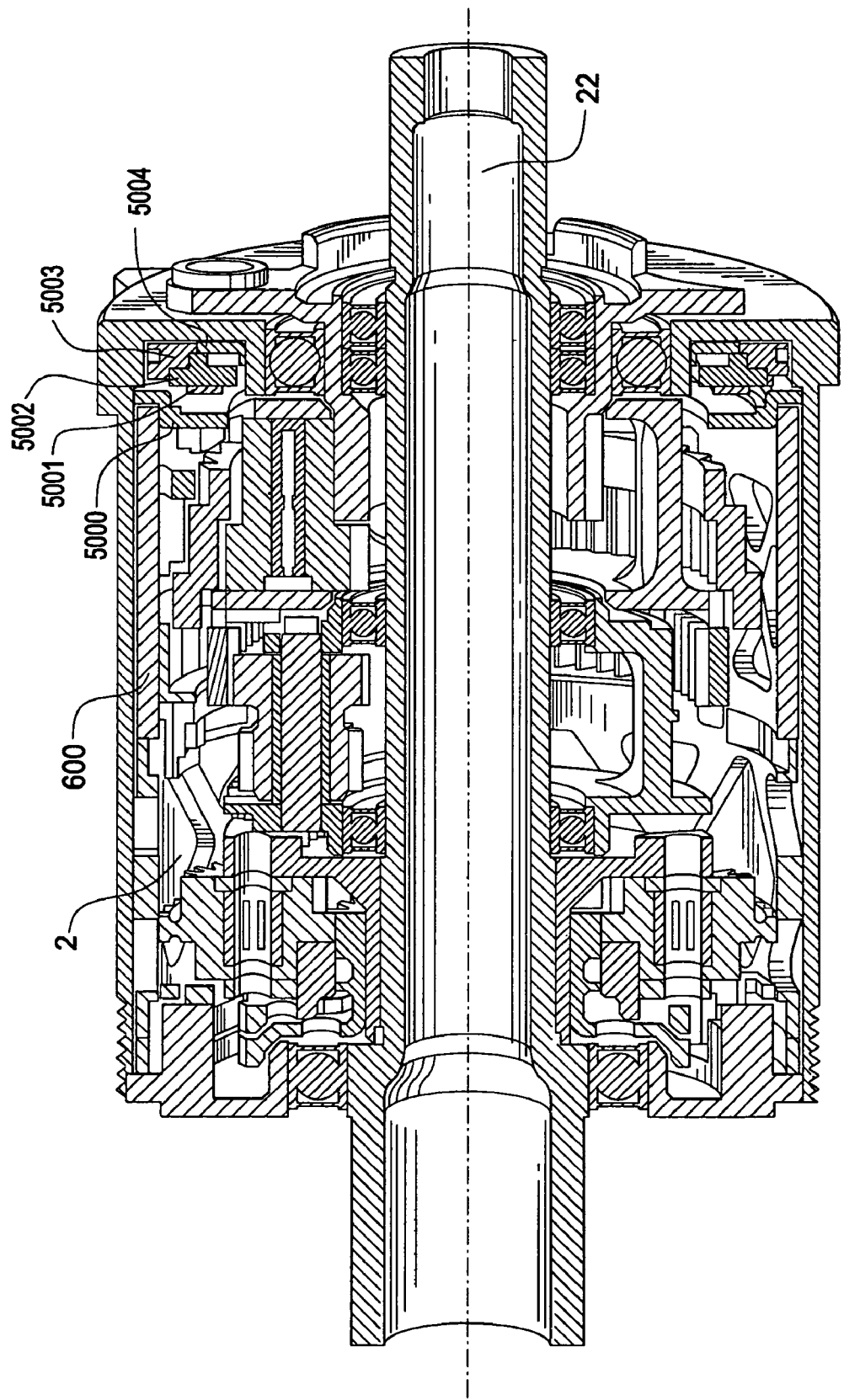
FIG. 43 is a cross-sectional view of a transmission.

FIG. 43 is a cross-sectional view of a transmission showing a shift mechanism inside the geared transmission. The transmission has input shaft 22 connected with crank arms 41, see FIG. 5. The shift mechanism described in FIGS. 43 to 58, namely, cam 600 as shown in FIG. 18, is replaced with the embodiment shown and described in the noted Figures. Otherwise the transmission and its operation is as described in FIGS. 1 to 42.

Figure 44:
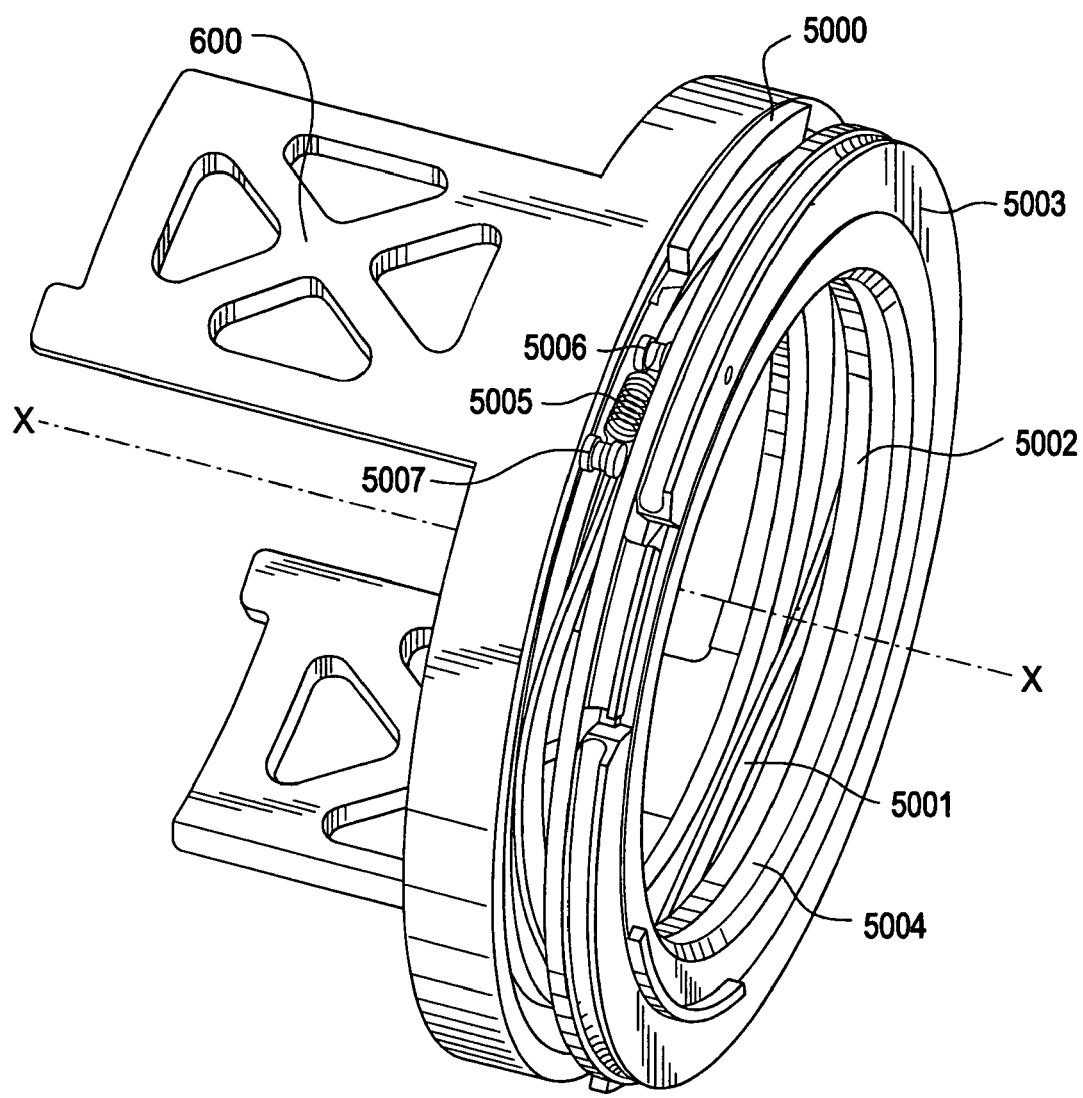
FIG. 44 is a perspective detail of a shift mechanism and cam.

Shifting from one gear to the next is achieved by rotating shift cam assembly 600, see FIG. 44. The shift cam assembly is operated by the inventive shift mechanism which comprises a retainer 5000, wave spring 5001, cable carrier 5003, ramped ring 5002, and fixed ring 5004.

Figure 51:
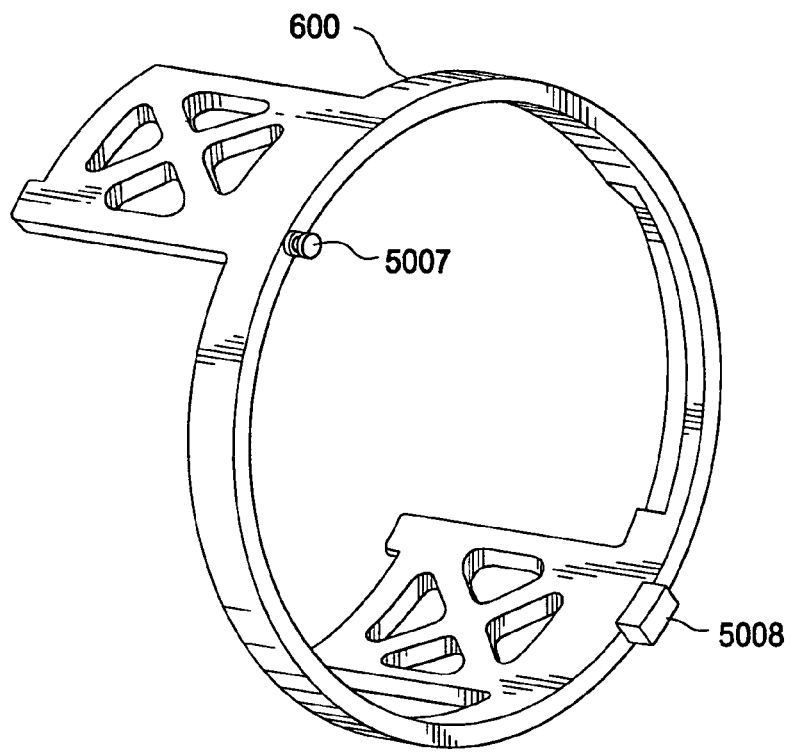
FIG. 51 is a perspective view of the shaft cam assembly.

FIG. 44 is a perspective detail of a shift mechanism and cam. FIG. 44 shows a subassembly of the shift mechanism and shift cam 600. Cable carrier 5003 is connected to shift cam 600 through extension spring 5005. One end of the spring 5005 is connected to pin 5006. Pin 5006 is attached to cable carrier 5003. The second end of the spring 5005 is connected to pin 5007. Pin 5007 is attached to the shift cam 600. FIG. 51 is a perspective view of the shaft cam assembly.

FIG. 45 is a section view of the shift mechanism inside the transmission housing. FIG. 45 shows inventive shift mechanism disposed inside the transmission housing 20. Shift cam 600 interfaces with ramped ring 5002 through protrusion 5008 and protrusion 5009 respectively. Cable carrier 5003 (FIG. 47) interfaces with ramped ring 5002 through protrusion 5011. Protrusion 5008 also interfaces with leg 5010 of retainer 5000.

FIG. 46 is a side view of the shift mechanism. FIG. 46 shows interaction of the cable 1 and shift mechanism. Cable 1 is connected to a twist shifter or trigger shifter installed on a bicycle handle bar, known in the art, see FIG. 46A. Cable 1 is routed around member 64 of the cable carrier 5003 in order to lock the cable to the carrier.

FIG. 46A is a detail of a handlebar shifter. A remote rotary shifter 8 known in the art is mounted to a handlebar 7, which handlebar is in turn attached to a typical bicycle frame F. Cables 1 are connected to the shifter 8 and the transmission. Shifter 8 is only used to actuate cables 1 by a rotary motion. Front wheel 2 is connected to the frame F as is known in the art.

Figure 47:
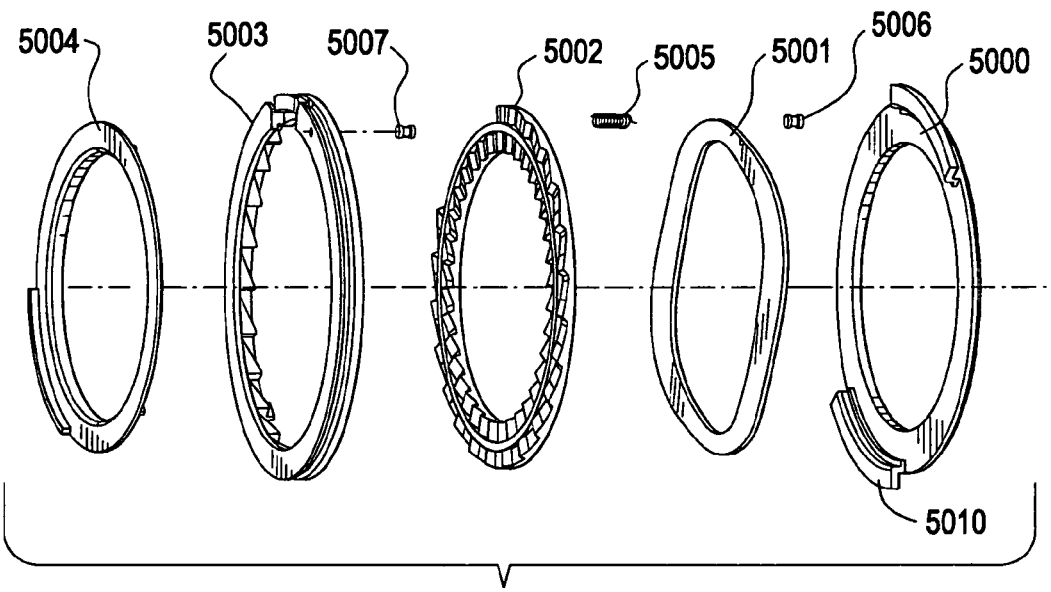
FIG. 47 is an exploded view of the shift mechanism.

FIG. 47 is an exploded view of the shift mechanism. Retainer 5000 is attached to shift cam 600.

Figure 48:
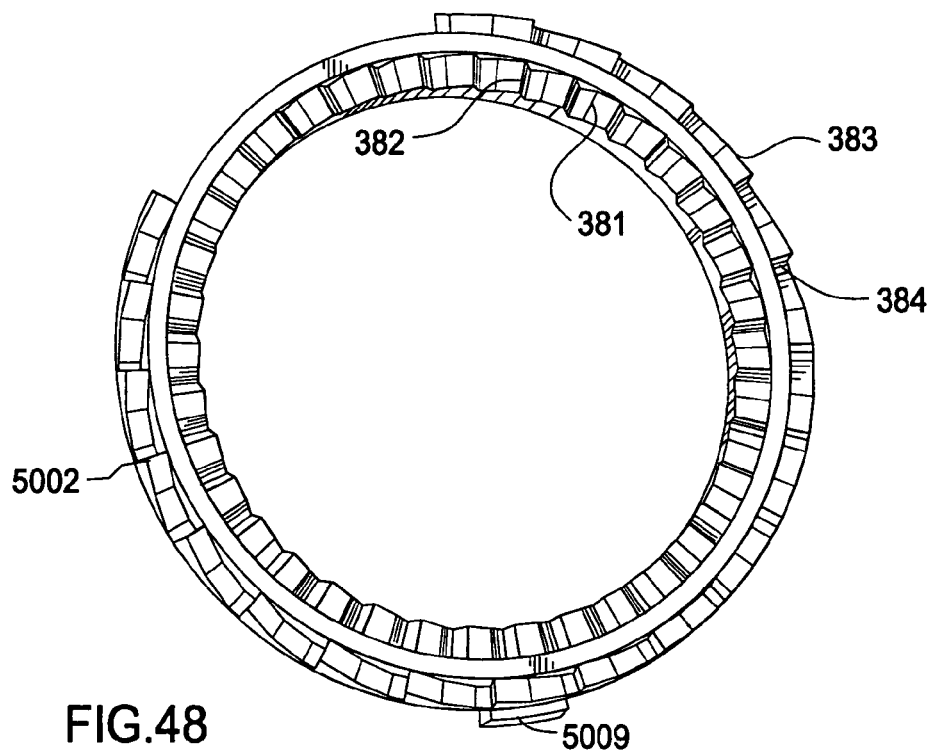
FIG. 48 is a perspective detail view of the ramped ring.
Figure 52:
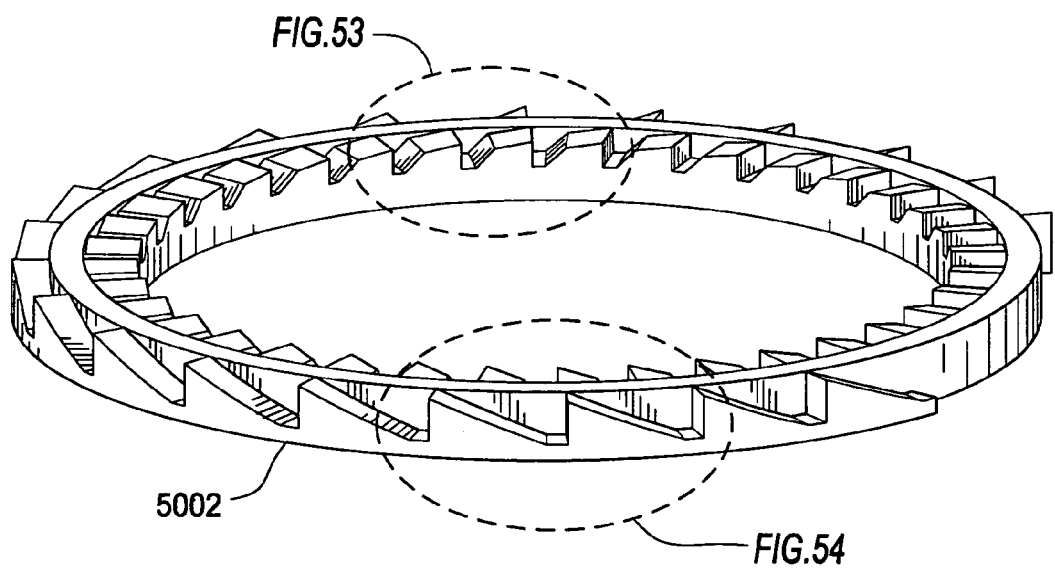
FIG. 52 is a perspective view of the ramped ring.
Figure 53:
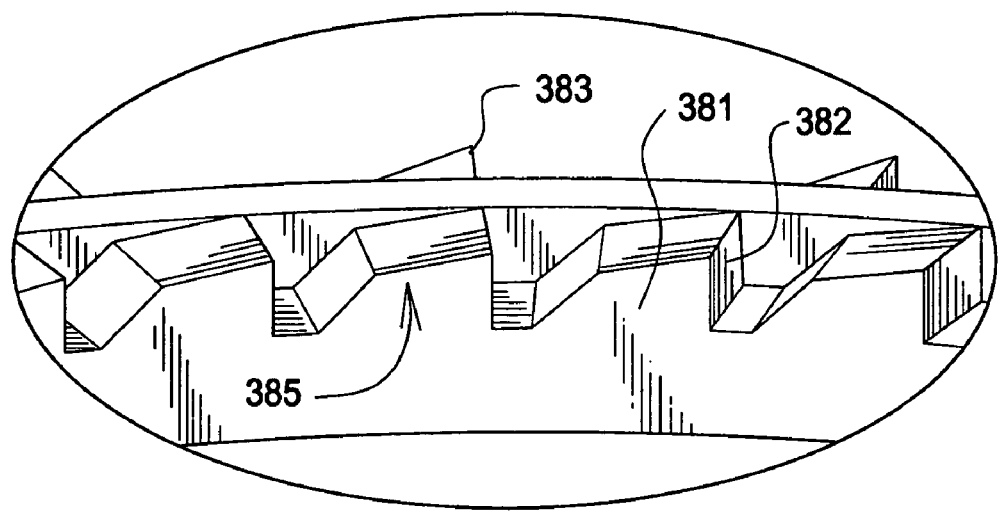
FIG. 53 is a detail of FIG. 52.
Figure 54:
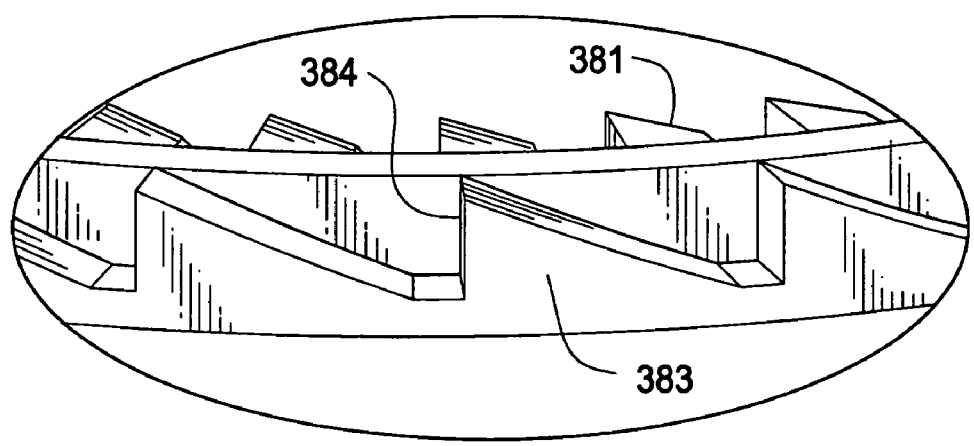
FIG. 54 is a detail of FIG. 52.

FIG. 48 is a perspective detail view of the ramped ring. FIG. 48 shows ramped ring 5002 with a plurality of inner ramps 381 and ramp faces 382, outer ramps 383 and ramp faces 384. FIG. 52 is a perspective view of the ramped ring. FIG. 53 is a detail of FIG. 52. FIG. 54 is a detail of FIG. 52.

Each inner ramp 381 further comprises a knee 385 disposed between two adjacent surfaces having different slopes. The purpose of knee 385 is when a shift is most of the way complete and the torque forces are relatively high when the rotation of cable carrier 5003 is near a maximum and approaching the knee 385, at which point the cable carrier ramps pass the knee 385 and the torque required suddenly drops, the shift will occur even if the operator attempts to stop the impending shift. Hence, the shift proper more easily occurs in the last bit of the shift movement. It also prevents the cable carrier ring 5003 from dwelling on the tip of the ramps because once the effort (torque) required to complete the shift decreases the shift quickly occurs. The same knee feature 543 appears on the ramp 541 on the fixed ring 5004, see FIG. 58.

Figure 49:
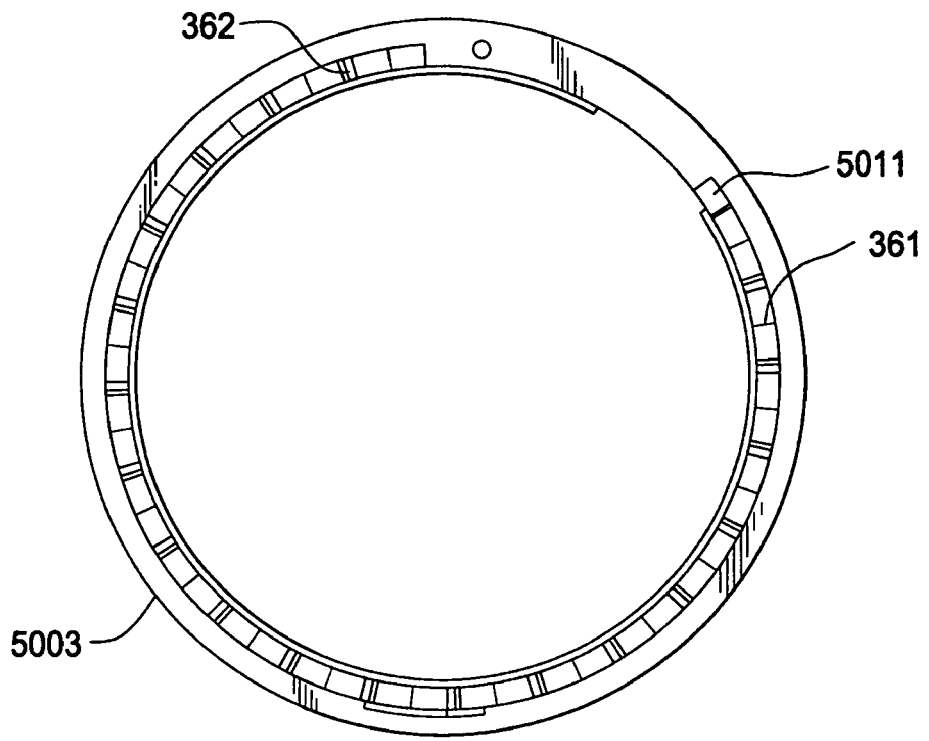
FIG. 49 is a side view of the cable retainer.
Figure 55:
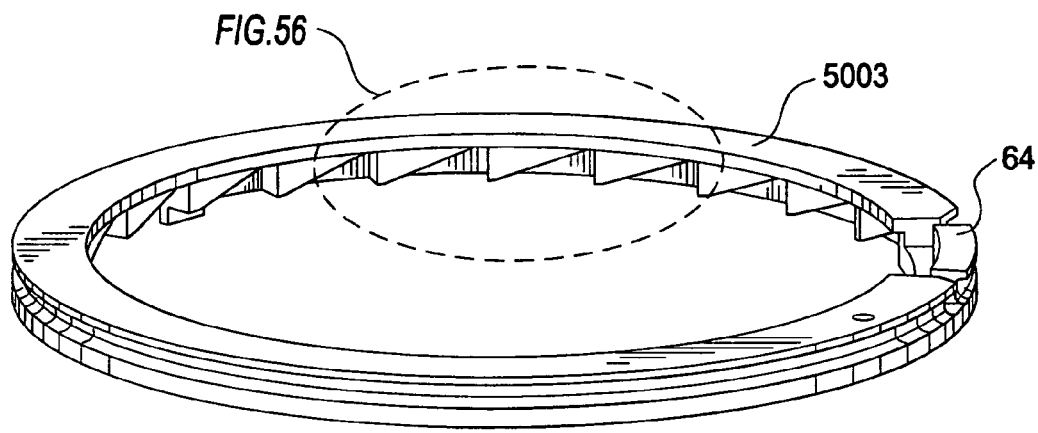
FIG. 55 is a perspective view of the cable carrier.
Figure 56:
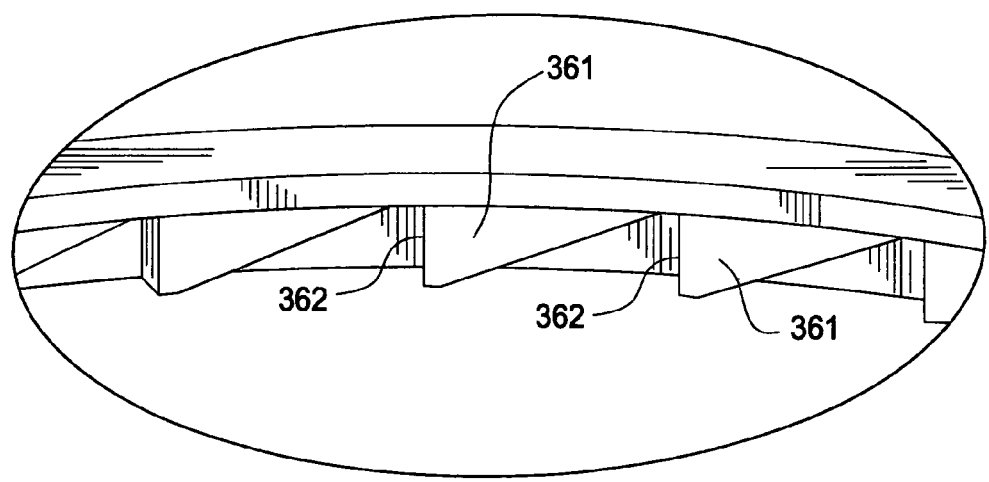
FIG. 56 is a detail of FIG. 55.

FIG. 49 is a side view of the cable retainer. FIG. 49 shows cable retainer 5003 with a plurality of ramp features 361 and ramp faces 362. FIG. 55 is a perspective view of the cable carrier. FIG. 56 is a detail of FIG. 55.

Figure 50:
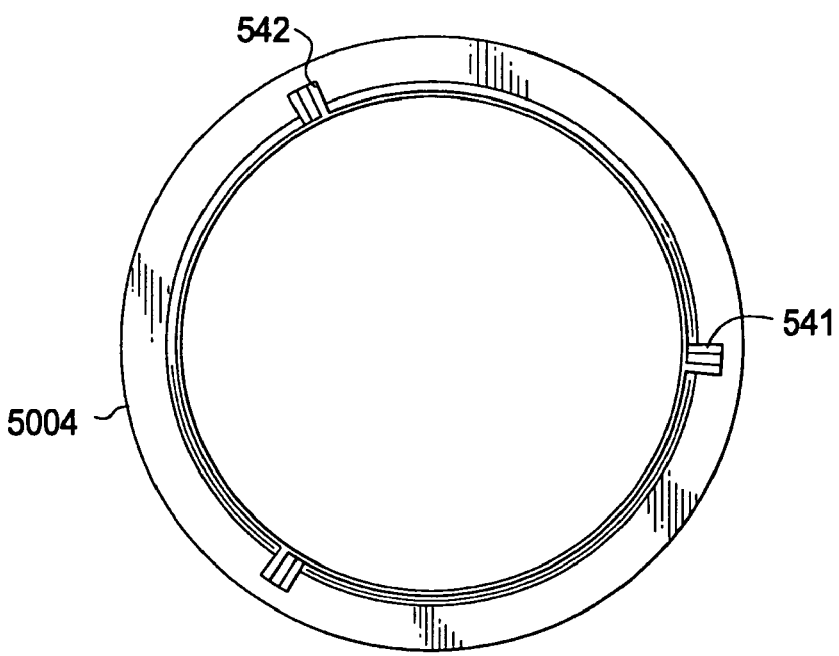
FIG. 50 is a side view of the fixed ring.
Figure 57:
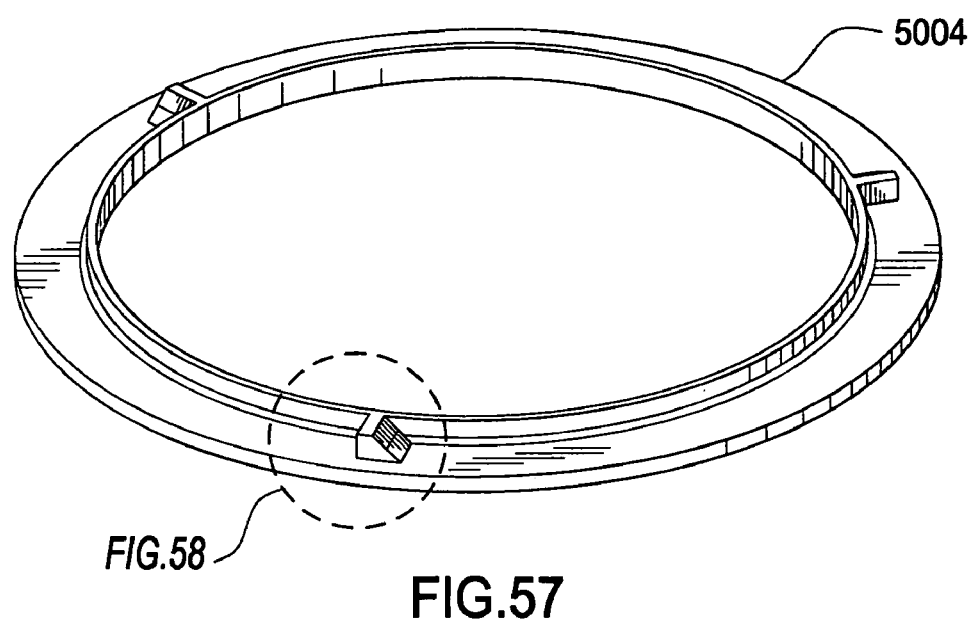
FIG. 57 is a perspective view of the fixed ring.
Figure 58:
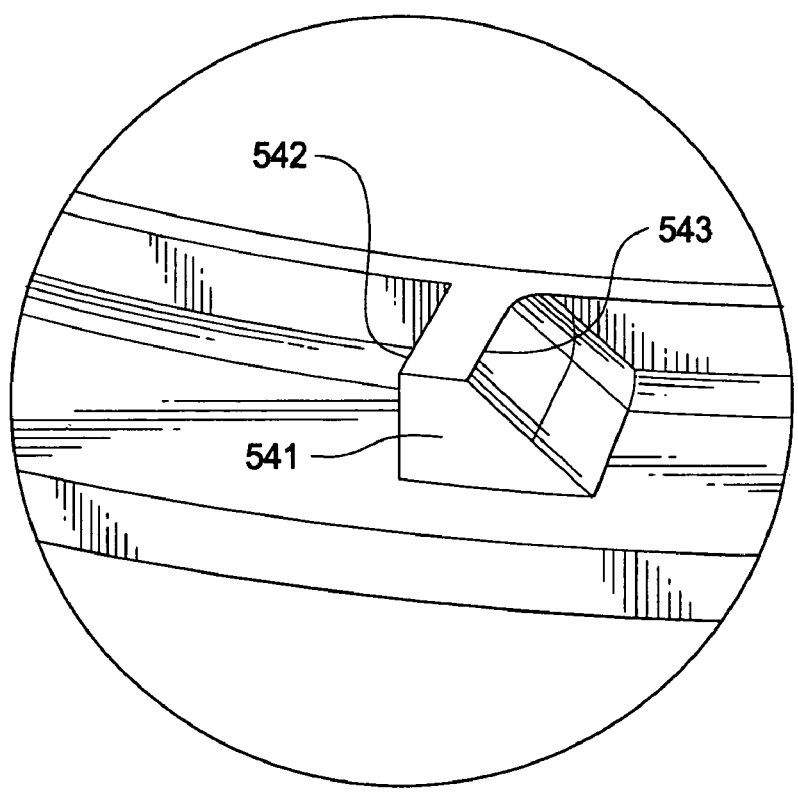
FIG. 58 is a detail of FIG. 57.

FIG. 50 is a side view of the fixed ring. FIG. 50 shows fixed ring 5004 with a plurality of ramps 541 and ramp faces 542. FIG. 57 is a perspective view of the fixed ring. FIG. 58 is a detail of FIG. 57. Fixed ring 5004 is fixed in position relative to housing 20 through mechanical interference with housing 20. Fixed ring 5004 ramp faces 542 interact with ramp faces 382 of ramped ring 5002 limiting clockwise rotational motion of ramped ring 5002. Ramps 541 of fixed ring 5002 interface with ramps 381 of ramped ring 5002 forcibly causing axial movement of ramped ring 5002 during counter clockwise rotation of the cable carrier 5003.

The shift mechanism operates in two modes; climbing gears and descending gears.

Operation in the climbing gear mode is as follows. Wave spring 5001 provides continuous axial force on ramped ring 5002, thereby pressing ramped ring 5002 into contact with cable ring 5003. Cable holder 5003 is positioned axially between ramped ring 5002 and housing 20, see FIG. 47. Cable 1 (actuator) is pulled by an operator (rider) in a manner that forcibly rotates cable carrier 5003 in a clockwise direction, as oriented according to FIG. 46. As cable carrier 5003 rotates pins 5007 and 5006 separate causing a spring force to increase in spring 5005. Pin 5007 is connected to shift cam 600. Pin 5006 is connected to cable carrier 5003. Cable carrier 5003 radially inward ramp features 361 cooperatively interface with ramped ring 5002 ramp radially outward ramp features 383. Ramped ring 5002 radially inward ramp features 381 cooperatively interface with fixed ring 5004 ramped features 541 such that face 542 reacts with ramped ring 5002 face 382 to restrict the clockwise rotation of ramped ring 5002. The restricted rotation of ramped ring 5002 causes relative motion between ramps 383 and 361 thereby forcibly moving ramped ring 5002 axially in direction X-X, which direction is normal to the direction of rotation, see FIG. 44. Put another way, direction X-X is collinear with the axis of rotation of input shaft 22. Ramped ring 5002 does not rotate during this portion of the axial movement. The axial movement of ramped ring 5002 continues until face 382 is positioned such that it no longer contacts face 542 allowing ramped ring 5002 to rotate. Rotational movement of ramped ring 5002 along with the axial movement of ramped ring 5002 occurs due to the position of ramps 383 and 361, the rotational force from the interface of ramps 383 and 361 and the axial force supplied by wave spring 5001. Rotation and axial movement of ramped ring 5002 continues until faces 382 and 542 interact again, at which point the rotation of the ramped ring and the shift cam is stopped in a predetermined position that corresponds to a selected transmission gear. The rotational movement of ramped ring 5002 frees shift cam 600 to rotate because during rotation of ramped ring 5002 protrusion 5009 moves away from protrusion 5008. Shift cam 600 is then forcibly rotated by the force of spring 5005 acting on pins 5007 and 5006, which is also reacting on cable carrier 5003. The rotational movement of shift cam 600 positions the transmission components so that a gear change occurs as described herein.

This may also be referred to as a "lost motion" shift mechanism. This is because ramped ring will move axially a predetermined distance before a rotation of the ramped ring and thereby of the shaft cam occurs, causing a shift of the gears in the transmission. The lack of rotation during a portion of the axial movement comprises the "lost" motion.

Operation in descending gear mode is as follows. Wave spring 5001 provides continuous axial force on ramped ring 5002, thereby pressing ramped ring 5002 into contact with the cable ring 5003. Spring 5005 provides a spring force for a rotational movement through pins 5007 and 5006 acting on shift cam 600 and cable holder 5003. Spring 5005 also causes protrusions 5009 and 5008 to be positioned in contact with one another. Cable 1 (actuator) is pulled by the operator in a manner that rotates cable carrier 5003 in a counter clockwise direction, as oriented according to FIG. 46. As cable carrier 5003 rotates, faces 362 interact with faces 384 forcibly rotating ramped ring 5002 in a counterclockwise direction as well. Rotating ramped ring 5002 causes shift cam 600 to rotate because protrusion 5009 is engaged with protrusion 5008. As ramped ring 5002 rotates, ramped ring 5002 ramps 381 interact with fixed ring 5004 ramps 541 forcibly causing axial movement of ramped ring 5002. Faces 542 and 382 separate during this rotation and axial movement. Axial movement of ramped ring 5002 continues until ramp 381 and 541 move past one another allowing ramped ring 5002 to reverse axial direction and seat itself with faces 542 and 382 coming back into contact. This seating of ramped ring 5002 fixes the position of protrusion 5009 and thereby protrusion 5008, which fixes the position of shift cam 600. The rotational movement of shift cam 600 positions the transmission components such that a gear change occurs as described herein.

The axial length of faces 382 and 542 are smaller than the axial length of faces 362 and 384 so ramped ring 5002 remains rotationally positioned with cable carrier 5003 within the length of ramps 361 and 383.

The angular length of ramps 381 and 541 correspond to the desired angular movement (rotation) of shift cam 122 and may vary from gear to gear if desired. If the operator/rider moves cable 1 to a position that does not correspond to a proper gear position for the transmission and then releases the cable, the mechanism will reposition itself to a proper gear position upon release of the cable due to the inclined ramps.

Although a form of the invention has been described herein, it will be obvious to those skilled in the art that variations may be made in the construction and relation of parts without departing from the spirit and scope of the invention described herein.

We claim:

1. A shift mechanism for a planetary gear transmission comprising:
   a planetary gear transmission;
   a shift cam (600) engaged with a planetary gear assembly in the planetary gear transmission, the shift cam having a shift cam protrusion (5008);
   a rotatable cable carrier (5003) connected to a moveable cable (1), the cable carrier comprising a ramped portion (361,362);
   a rotatable ramped ring (5002), the ramped ring comprising a ramped portion (381,382) cooperatively engaged with the cable carrier ramped portion, and further the ramped ring having a protrusion (5009) cooperatively engagable with the shift cam protrusion (5008);
   a rotation of the cable carrier urging the ramped ring (5002) a predetermined distance in a direction normal to the plane of rotation of the cable carrier, the shift cam (600) held against rotation by engagement with the ramped ring (5002), and at which predetermined distance the ramped ring is allowed to rotate with the cable carrier (5003) simultaneous with the axial movement of the ramped ring (5002); and a spring (5005) connected between the cable carrier (5003) and the shift cam (600), the shift cam reacting to the spring force rotates upon rotation of the ramped ring (5002) by an amount of rotation that is limited by engagement of the shift cam protrusion (5008) with the ramped ring protrusion (5009) and during which rotation of the shift cam the transmission shifts gears.

2. The shift mechanism as in claim 1, wherein the moveable cable is connected to a remote actuator.

3. The shift mechanism as in claim 1, wherein a spring (5001) urges ramped ring (5002) into engagement with cable carrier (5003).

* * * * *